US 12,052,169 B2

(12) United States Patent
Dutta

(10) Patent No.: US 12,052,169 B2
(45) Date of Patent: Jul. 30, 2024

(54) NEIGHBOR DISCOVERY FOR BORDER GATEWAY PROTOCOL IN A MULTI-ACCESS NETWORK

(71) Applicant: Nokia Solutions and Networks Oy, Espoo (FI)

(72) Inventor: Pranjal Kumar Dutta, Sunnyvale, CA (US)

(73) Assignee: Nokia Solutions and Networks Oy, Espoo (FI)

(*) Notice: Subject to any disclaimer, the term of this patent is extended or adjusted under 35 U.S.C. 154(b) by 444 days.

(21) Appl. No.: 17/030,039

(22) Filed: Sep. 23, 2020

(65) Prior Publication Data

US 2022/0094637 A1   Mar. 24, 2022

(51) Int. Cl.
*H04L 45/58*   (2022.01)
*H04L 45/02*   (2022.01)
*H04L 45/50*   (2022.01)

(52) U.S. Cl.
CPC .............. *H04L 45/58* (2013.01); *H04L 45/02* (2013.01); *H04L 45/04* (2013.01); *H04L 45/50* (2013.01)

(58) Field of Classification Search
None
See application file for complete search history.

(56) References Cited

U.S. PATENT DOCUMENTS 8,953,446 B1 * 2/2015 Wang ................. H04L 12/4641 370/231
10,574,688 B1   2/2020 Hagelstrom et al.
10,708,295 B1 * 7/2020 Hagelstrom .......... H04L 63/145
10,841,216 B1 * 11/2020 Hoang ..................... H04L 45/66
11,165,691 B1 * 11/2021 Kompella ............... H04L 45/74
11,277,328 B1 * 3/2022 Sharma .................. H04L 45/02
(Continued)

FOREIGN PATENT DOCUMENTS

CN   102484612 A   5/2012
CN   10450637 A    4/2015

OTHER PUBLICATIONS

Xu, "BGP Neighbor Discovery", Internet-Draft, Network Working Group, Nov. 26, 2019, 33 pages.
(Continued)

*Primary Examiner* — Phirin Sam
(74) *Attorney, Agent, or Firm* — Tong, Rea, Bentley & Kim, LLC

(57) ABSTRACT

A first router determines a designated router (DR) from a set of routers that are interconnected by a network based on a border gateway protocol (BGP). The set includes the first router. In response to the first router being the DR, the first router forms adjacencies with non-DR routers from the set and distributes reachability advertisements from the set of routers to the non-DR routers in the set. In response to the first router not being the DR, the first router forms an adjacency with the DR. The first router then conveys reachability advertisements to the DR and receives reachability advertisements from the routers in the set via the DR. The DR is determined based on receiving information at the first router indicating an identity of the DR, e.g., configuration information received from a controller, or by electing a DR based on priority values assigned to the routers and advertised in messages transmitted by the routers.

26 Claims, 14 Drawing Sheets

(56) References Cited

U.S. PATENT DOCUMENTS

| | | | | |
|---|---|---|---|---|
| 2014/0369345 | A1* | 12/2014 | Yang | H04L 12/1886 |
| | | | | 370/392 |
| 2015/0055650 | A1* | 2/2015 | Bhat | H04L 45/03 |
| | | | | 370/390 |
| 2016/0085560 | A1* | 3/2016 | Gourlay | G06F 9/45558 |
| | | | | 713/2 |
| 2018/0034648 | A1* | 2/2018 | Nagarajan | H04L 69/14 |
| 2018/0034722 | A1* | 2/2018 | Gupta | H04L 45/08 |
| 2019/0123999 | A1* | 4/2019 | Chunduri | H04L 67/147 |
| 2019/0305988 | A1* | 10/2019 | Bickhart | H04L 12/4641 |
| 2019/0386913 | A1* | 12/2019 | Wei | H04L 49/1515 |
| 2020/0169516 | A1* | 5/2020 | Patel | H04L 45/02 |
| 2020/0322268 | A1* | 10/2020 | Thoria | H04L 45/507 |
| 2020/0366593 | A1* | 11/2020 | Kaplan | H04L 45/16 |
| 2020/0412618 | A1* | 12/2020 | Mekkattuparamban | |
| | | | | H04L 43/0876 |
| 2021/0058284 | A1* | 2/2021 | Chandramohan | H04L 45/586 |
| 2021/0126854 | A1* | 4/2021 | Guo | H04L 45/54 |
| 2021/0226890 | A1* | 7/2021 | Thoria | H04L 12/66 |
| 2021/0377174 | A1* | 12/2021 | Gulrajani | H04L 47/125 |
| 2021/0385155 | A1* | 12/2021 | Suryanarayana | H04L 45/28 |

OTHER PUBLICATIONS

Gredler, "North-Bound Distribution of Link-State and Traffic Engineering (TE) Information Using BGP", Internet Engineering Task Force (IETF), RFC 7752, Mar. 2016, 48 pages.

Talaulikar, "BGP Link-State Extensions for BGP-only Fabric", Inter-Domain Routing, Internet-Draft, Sep. 3, 2018, 21 pages.

Patel, "Shortest Path Routing Extensions for BGP Protocol", Network Working Group, Internet-Draft, Mar. 24, 2020, 22 pages.

Rekhter, "A Border Gateway Protocol 4 (BGP-4)", Network Working Group, RFC 4271, Jan. 2006, 104 pages.

"Transmission Control Protocol", DARPA Internet Program Protocol Specification, RFC 793, Sep. 1981, 89 pages.

Lapukhov, "Use of BGP for Routing in Large-Scale Data Centers", Internet Engineering Task Force (IETF), RFC 7938, Aug. 2016, 35 pages.

Bates, "Multiprotocol Extensions for BGP-4", Network Working Group, RFC 4760, Jan. 2007, 12 pages.

ETSI, "Digital Video Broadcasting (DVB); Second Generation DVB Interactive Satellite System (DVB-RCS2); Guidelines for the Implementation and Use of TS 101 545-3," ETSI, TR 101 545-5, vol. V1.1.1, Mar. 18, 2013, XP014196487, 166 pages.

Eastlake, D., et al., "Transparent Interconnection of Lots of Links (TRILL): Clarifications, Corrections and Updates," Internet Engineering Task Force, RFC 7180, May 2014, 24 pages.

European Search Report mailed in corresponding EP 21193050.8 on Feb. 1, 2022, 10 pages.

Communication pursuant to Article 94(3) EPC issued for corresponding EP Application No. 21193050.8, Jun. 27, 2023, 6 pages.

Syngress Media, Inc.: "CCNP Advanced Cisco Router Configuration Study Guide," (Exam 640-403), Chinese edition copyright 2000 by China Machine Press.

Office Action and Search Report, China National Intellectual Property Administration, Chinese Patent Application No. 202111101069.X, Feb. 8, 2024, 7 pages.

* cited by examiner

NEIGHBOR DISCOVERY FOR BORDER GATEWAY PROTOCOL IN A MULTI-ACCESS NETWORK

BACKGROUND

Data centers deploy racks of servers to provide services such as cloud-based applications to various clients. A typical data center includes a set of interconnected routers that receive information from the clients, distribute the information to the appropriate servers, collect information from the servers, and forward the collected information back to the clients. For example, the routers can be deployed in a Clos topology that creates a leaf-and-spine system of interconnected leaf routers and spine routers. The leaf routers are access gateways such as top-of-the-rack (TOR) switches for a pool of servers in the same rack. The leaf routers are redundantly connected to spine routers that are used to route information between the leaf routers. For example, a 5-stage Clos network includes a first spine (also referred to as tier 1) including first spine routers, one or more second spines (also referred to as tier 2) that include second spine routers that are each redundantly connected to a pair of first spine routers, and leaf routers (also referred to as tier 3) that are each redundantly connected to a pair of second spine routers. Thus, the servers connected to the leaf routers are connected to each other across no more than five hops. The topology of the network of servers and routers in a data center frequently grows (e.g., scales out horizontally) in response to the addition of servers and other systems to the network.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
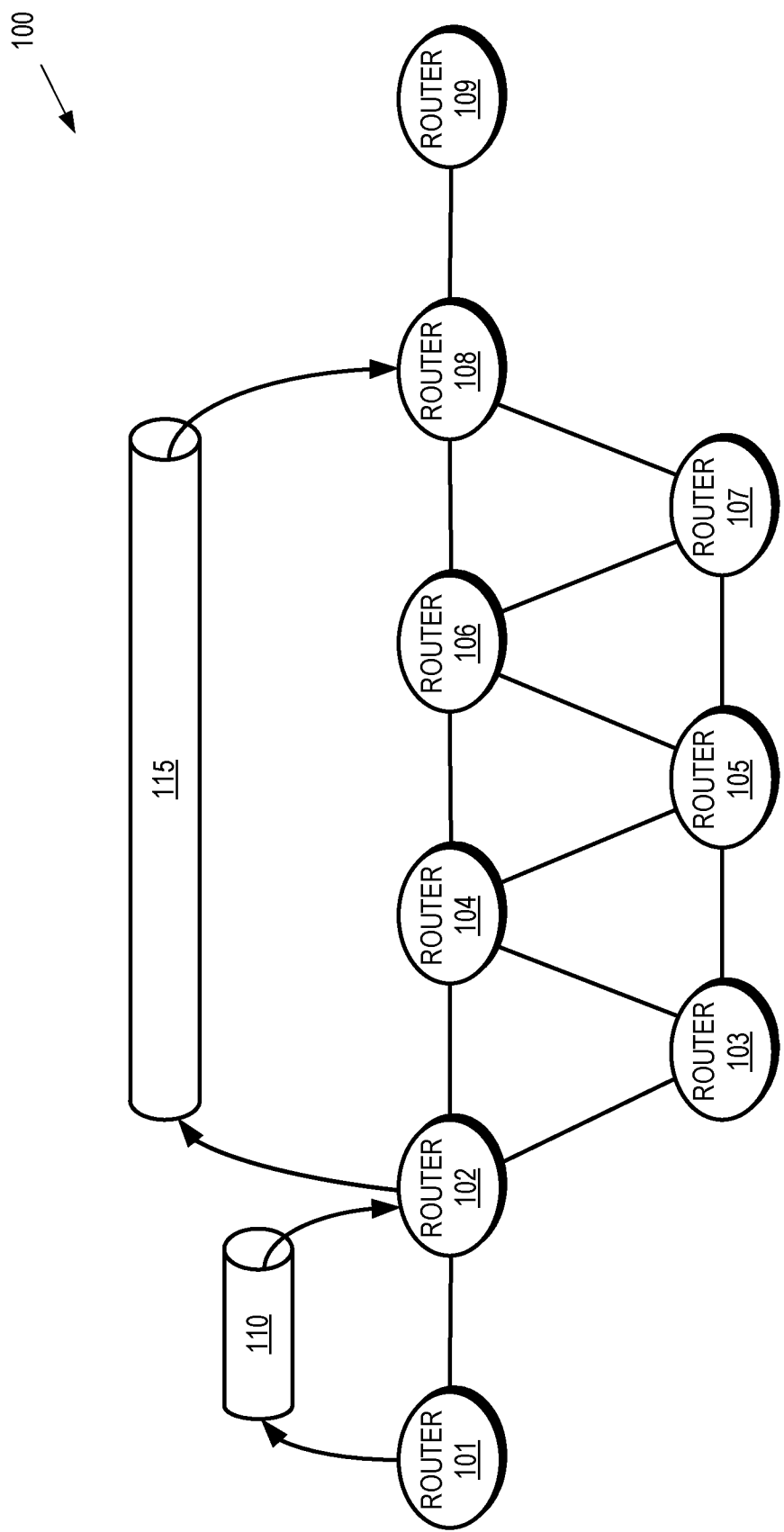
FIG. 1 is a block diagram of a network implements single hop and multi-hop border gateway protocol (BGP) sessions according to some embodiments.

Many data centers leverage the border gateway protocol (BGP) as an underlay routing protocol that supports flexible policy-based routing. BGP is preferable to other link-state routing protocols such as open shortest path first (OSPF, OSPFv3) and intermediate system-to-intermediate system (IS-IS) because these link-state protocols force all traffic between a source and a destination to follow the same path. A BGP session runs as an application atop a transport layer protocol such as transmission control protocol (TCP), which provides lossless, reliable, in-order delivery of BGP messages. Leaf routers are allocated different autonomous system numbers (ASNs) and a single ASN is allocated to all the spine routers in the spine. BGP sessions are formed between the entities associated with each ASN. To form BGP sessions, a BGP router performs neighbor discovery to determine a neighbor Internet protocol (IP) address and an AS for each BGP neighbor on all links of the BGP router, as well as generating and distributing information such as the router's AS, liveliness of the neighbor routers/spines, link attributes such as addresses, a maximum transfer unit (MTU), and the like. The BGP router initiates neighbor discovery by transmitting a "Hello" message on all its links. The Hello message includes the ASN and the BGP identifier of the router, a hold time for the Hello message, and, in some cases, one or more Type-Length-Values (TLVs) to represent other parameters. Neighboring BGP routers establish a TCP connection in response to one of the BGP routers receiving a Hello message from the other BGP router and establishing adjacency between the BGP routers. The BGP session is then established over the top of the TCP connection.

In some cases, a local area network (LAN) interconnects leaf routers and a spine in a data center that implements a Clos network to avoid linear growth in the number of links between the spine routers and the leaf routers. For example, if 100 leaf routers are connected to the spine, then each spine router requires at least 100 links to the leaf routers, or at least 200 links to provide redundancy. In contrast, each leaf router or spine router only requires one link to the LAN, or two links to provide redundancy. However, when leaf routers and spine routers are interconnected by a LAN, each router is required to broadcast a Hello message on its link to the LAN. The broadcasted Hello message is received by every other router connected to the LAN. Consequently, a full mesh of BGP sessions are formed among the leaf and spine routers. This causes several problems. For example, BGP sessions are formed among the leaf routers and if there are N leaf routers attached to a LAN then each leaf router will have (N−1) unwanted BGP sessions to other leaf routers, which violates the rules of Clos topology. In some cases, the number N of leaf routers is in the hundreds. Unnecessary BGP sessions are also formed among spine routers within the same spine. For another example, a LAN that includes N routers needs to convey N*(N−1)/2 reachability advertisements to represent the links between the routers even though the routers are mutually adjacent on the LAN. However, any data packet sent by one router on the LAN is received by the other routers on the LAN, so the reachability advertisements of the LAN by each router are unnecessary. The entire LAN segment can be represented as a single link, so only one reachability advertisement is needed within the LAN and to the external network, irrespective of the number of routers in the LAN.

FIGS. 1-17 disclose techniques for reducing (or eliminating) unnecessary sessions and reachability advertisements between routers that are interconnected by a multi-access network (such as a LAN) by electing a designated router. The other (non-elected) routers are constrained to form adjacencies with the designated router and reachability advertisements are conveyed from the other routers to the designated router. The designated router distributes the reachability advertisements (including its own reachability advertisements) to the other routers that are interconnected by the multi-access network. The designated router also represents the set of routers in the multi-access network as a single virtual router (or pseudo-node) to external networks that are connected to the multi-access network. In some embodiments, the external network includes spines or spine routers in a Clos topology. The designated router advertises reachability of the virtual router to the external network on behalf of the routers attached to the multi-access network. In some embodiments, a backup designated router is elected from the routers attached to the multi-access network. The backup designated router performs the functions of the designated router in response to failure or unavailability of the designated router. In some embodiments, the designated router and the backup designated router (if present) are elected based on priority values that are assigned to the routers and advertised in their respective Hello messages. In other embodiments, the designated router and the backup designated router (if present) are explicitly configured. The designated router or a backup designated router informs the other routers of its role one-by-one by sending multicast Hello messages across the LAN. Routers other than a designated router or backup designated router do not multicast Hello messages. Instead, these types of routers begin unicasting Hello messages to the neighboring router in response to receiving a multicast Hello message from a designated router or backup designated router (a neighboring router) to form an adjacency.

FIG. 1 is a block diagram of a network 100 implements single hop and multi-hop border gateway protocol (BGP) sessions according to some embodiments. The network 100 includes a set of routers 101, 102, 103, 104, 105, 106, 107, 108, 109, which are collectively referred to herein as "the routers 101-109." The routers 101-109 establish sessions for communication based on the BGP, is a widely used control plane protocol to exchange routing information, especially between autonomous systems (ASes). Some embodiments of BGP are extended to support the exchange of network layer reachability information (NLRI) that is used to set up different types of layer-3, layer-2 virtual private networks (VPNs), multiprotocol label switching (MPLS) over label switched paths (LSPs), and the like. The extended version of BGP is referred to as a Multi-Protocol BGP (MP-BGP).

The routers 101-109 use the information exchanged via BGP to establish BGP peering between a pair of BGP routers. The BGP peering is also referred to as a BGP session. The peering BGP routers can be directly connected or could be multiple hops away. In the illustrated embodiment, the BGP session 110 between the routers 101 and 102 is a single hop session because the routers 101, 102 are directly connected by a link. The BGP session 115 between the routers 102 and 108 is a multi-hop session because the BGP session 115 traverses multiple routers, e.g., the routers 104, 106.

The BGP sessions 110, 115 run as applications over a transmission control protocol (TCP), which provides lossless, reliable, and in-order delivery of BGP messages in a session. To create a BGP session, the peering BGP routers are configured to create a TCP session on a predetermined port number such as port 179, which indicates BGP as the application atop TCP. Once the TCP connection is operational, the peering BGP routers establish the BGP session over the TCP connection. After a BGP session is established, the peering routers can exchange reachability information (as messages) over the BGP session. In some embodiments, a BGP router periodically sends 19-byte keep-alive messages every 60 seconds to maintain the session. A BGP session between two routers in the same autonomous system (AS) is referred to as Internal BGP or Interior Border Gateway Protocol (i-BGP). A BGP session between routers in different ASes is referred to as an External BGP or Exterior Border Gateway Protocol (eBGP).

In some embodiments, BGP is used as an exterior gateway protocol to exchange routing information among ASes. In other embodiments, BGP is used as a control plane protocol in large scale data center to support network virtualization overlays, e.g., virtual extensible LAN (VXLAN), network virtualization using generic routing encapsulation (NVGRE), and MPLS over user datagram protocol (MPLSoUDP) based overlays. BGP can also be leveraged as an underlay routing protocol instead of link-state routing protocols like IS-IS and OSPF in some large-scale data centers. Conventional link state protocols compute paths using a Shortest-Path-First (SPF) algorithm. Consequently, all traffic between a source and a destination follows the same SPF path, which does not provide the flexibility of routing required within a data center. In a data center, the network topologies grow (scale out horizontally) frequently due to continual addition of servers and other systems into the network. BGP supports policy-based routing so that traffic can be routed along different paths based on policies associated with different types of traffic. This aspect of BGP is one reason for its deployment as the underlay routing protocol in data centers. Some embodiments of BGP also support link-state and SPF capabilities like IS-IS and OSPF.

Figure 2:
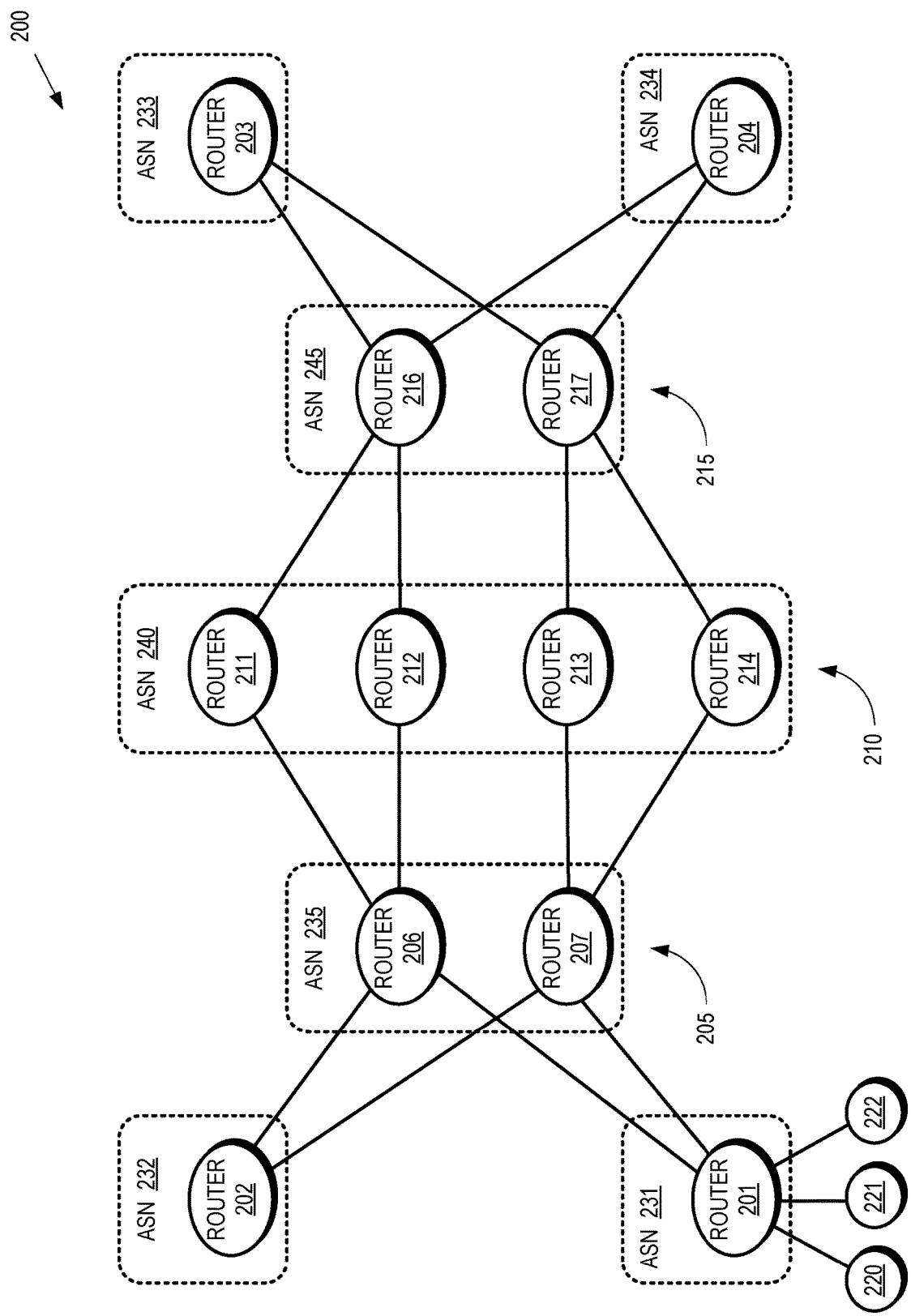
FIG. 2 is a block diagram of a 5-stage Clos network that supports BGP sessions between routers according to some embodiments.

FIG. 2 is a block diagram of a 5-stage Clos network 200 that supports BGP sessions between routers according to some embodiments. The 5-stage Closnetwork 200 is implemented in a leaf-and-spine topology that interconnects leaf routers via one or more spines that includes fine routers. In the illustrated embodiment, the 5-stage Clos network 200 includes four leaf routers 201, 202, 203, 204 (collectively referred to herein as "the leaf routers 201-204") that are interconnected by spines 205, 210, 215. The spine 205 includes the routers 206, 207, the spine 210 includes the routers 211, 212, 213, 214, and the spine 215 includes the routers 216, 217. The leaf routers 201-204 provide connections to one or more servers such as the servers 220, 221, 222 that are connected to the leaf router 201. The numbers of routers, spines, spine routers, and servers shown in FIG. 2 are chosen for illustrative purposes. Some embodiments of the network 200 include more or fewer leaf routers, spines, spine routers, and servers. Furthermore, the numbers of entities in the network 200 can change dynamically due to the additional removal of one or more routers, spines, spine routers, or servers.

The leaf routers 201-204 are redundantly connected to two or more spine routers. In the illustrated embodiment, the leaf router 201 is redundantly connected to the spine routers 206, 207 and the leaf router 202 is redundantly connected to the spine routers 206, 207. The leaf router 203 is redundantly connected to the spine routers 216, 217 and the leaf router 204 is redundantly connected to the spine routers 216, 217. Spine routers in different spines are also redundantly connected. In the illustrated embodiment, the spine router 206 is redundantly connected to the spine routers 211, 212 and the spine router 207 is redundantly connected to the spine routers 213, 214. The leaf routers 201-204 are not interconnected and the spine routers within a spine are not interconnected in a Clos topology. The servers 220-222 are therefore connected to other servers associated with other leaf routers 202-204 by no more than five hops.

Autonomous system numbers (ASN) are allocated to leaf routers and spines. In the illustrated embodiment, the autonomous system numbers 231, 232, 233, 234 (collectively referred to herein as "the ASN 231-234") are allocated to the leaf routers 201-204, respectively. The ASN 235, 240, 245 are allocated to the spines 205, 210, 215, respectively. In some embodiments, the ASN 231-234, 235, 240, 245 are allocated from a Private Use ASN space in the range 64512-65534. The routers 201-204, 206, 207, 211-214, 216, 217 in the 5-stage Clos network 200 are BGP speakers. A pair of directly connected routers always belong to different ASes in the topology of the 5-stage Clos network 200, so sessions between them are established as e-BGP sessions.

Neighbor provisioning in BGP configures the neighbor IP address and AS for the BGP neighbor on the links of the BGP routers. Thus, BGP provisioning is carefully updated in response to growth of a data center fabric in response to addition of new leafs, spines, and links between them. In contrast to link-state protocols, conventional BGP does not support automatic discovery of neighbors or route exchange between neighbors by simply adding links and nodes of the fabric into the routing protocol operation. For example, if a new leaf router is connected to the spine 205 in response to deploying a new server rack, the new leaf router needs to be configured for the e-BGP sessions with the routers 206, 207 and each of the routers 206, 207 needs to be configured for e-BGP session with the leaf router. In some embodiments, hundreds of leaf routers are added to the spine 205 and the addition of each leaf router requires explicit configuration for e-BGP peering.

Furthermore, in BGP deployments in large scale data centers, BGP should be able to describe its links and its neighbors on its directly connected links and export this information via BGP-LS (BGP-Link State) to provide a detailed view of the link-level topology of the data center running BGP. The BGP-LS is an extension to BGP to carry link state information similar to link state protocols such as OSPF, IS-IS, OSPFv3, and the like. The BGP-LS is typically used to carry link state and traffic engineering information from routers to a centralized path computational entity. The ability of BGP to discover its neighbors over its links, monitor their liveliness, and learn the link attributes (such as addresses) is required for conveying the link-state topology in such a BGP network. This information can be leveraged to support link-state routing capabilities in BGP. This information can also be leveraged to convey the link-state topology in a network running traditional BGP routing and to enable end to end traffic engineering use-cases spanning across data centers and the core/access networks.

To implement BGP neighbor discovery, BGP routers multicast UDP based Hello messages on every link. In the message, the UDP destination port is encoded as a predetermined value (such as 179) and a destination address in the IP header of the multicast packets is encoded as an "all routers on this subnet" group multicast address. For example, the group multicast address can be encoded as 224.0.0.2 in the IPv4 case and FF02::2 in the IPv6 case. The IP source address is set to the address of the interface over which the message is sent out.

Some embodiments of the BGP Hello message include one or more of the following:
  An ASN and BGP Identifier of the sender router.
  Hold Time specifying the time the receiving BGP router maintains its record of Hello messages received from the sending BGP router (e.g., a hello adjacency with the sending BGP router) without receipt of another Hello message.
  One or more TLVs (Type-Length-Value format) describing various other parameters, such as TCP connection specific parameter etc.

When a BGP router receives a Hello message from a directly connected neighbor on the link, and parameters included in the message are agreeable to the receiving BGP router, then the receiving BGP router establishes an adjacency with the neighbor. Once an adjacency is established, the BGP routers establish a TCP connection, followed by the establishment of the BGP session atop the TCP connection. This approach is used to discover peering relationships with directly connected routers. For example, the routers 201-204, 206, 207, 211-214, 216, 217 in the 5-stage Clos network 200 are implemented as BGP routers without any explicit configuration of e-BGP peering with any neighboring router. Each of the routers 201-204, 206, 207, 211-214, 216, 217 multicasts BGP Hellos on its links in the 5-stage Clos network 200. The neighboring BGP routers discover each other automatically via exchange of the Hello messages. For example, the routers 201 and 206 multicast BGP Hellos on the link that connects them. As a result, the routers 201 and 206 discover each other and learn the parameters required to establish an e-BGP session between them. An adjacency is formed between the routers 201 and 206 and then a BGP session is established using the parameters associated with the adjacency. This approach to neighbor discovery has drawbacks when multiple BGP routers are interconnected by a broadcast multi-access network such as an ethernet LAN.

Figure 3:
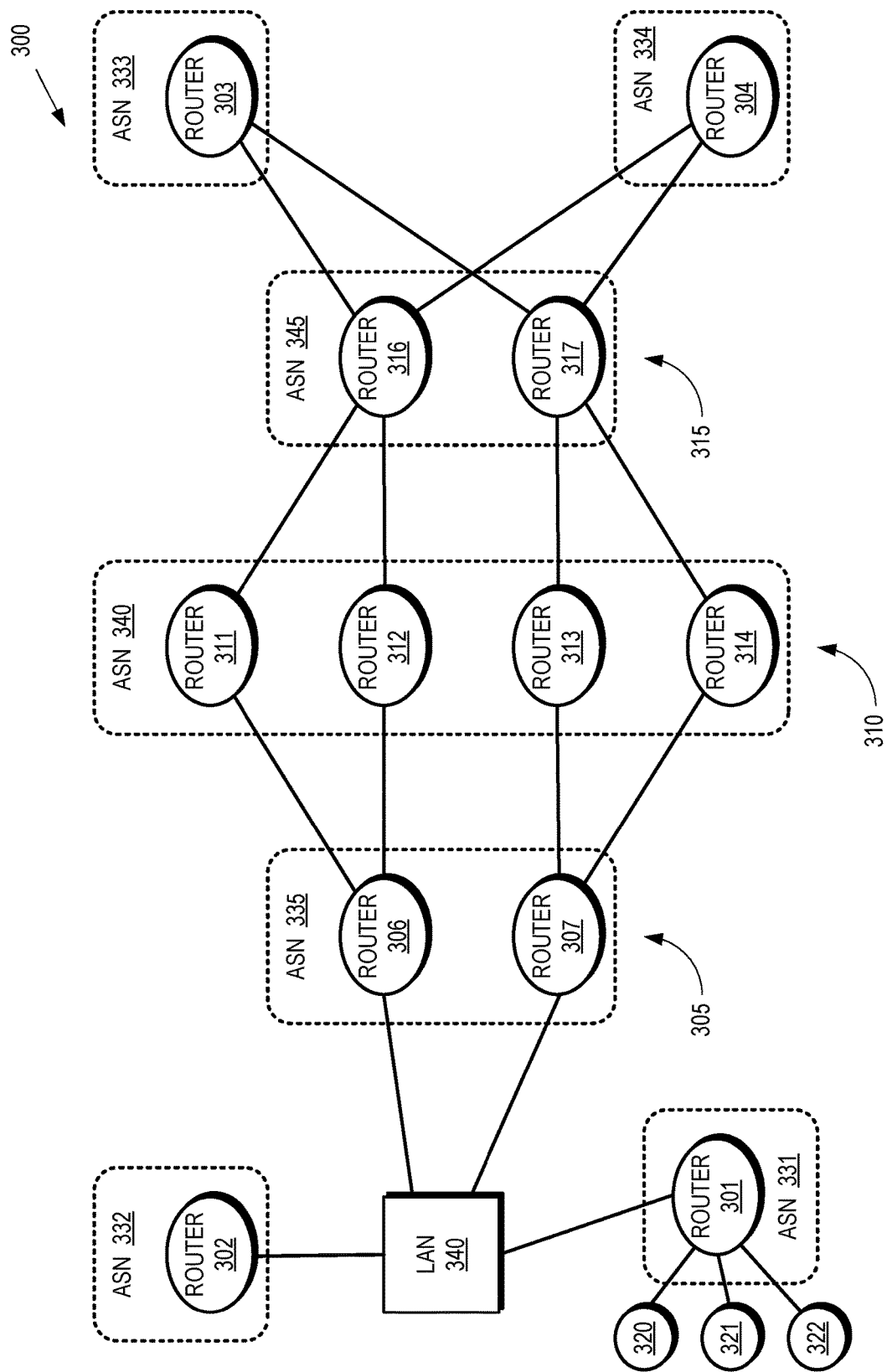
FIG. 3 is a block diagram of a 5-stage Clos network that supports BGP sessions between routers that are interconnected by a multi-access network according to some embodiments.

FIG. 3 is a block diagram of a 5-stage Clos network 300 that supports BGP sessions between routers that are interconnected by a multi-access network according to some embodiments. The 5-stage cost network 300 is implemented in a leaf-and-spine topology that interconnects leaf routers via one or more spines that include spine routers. In the illustrated embodiment, the 5-stage Clos network 300 includes four leaf routers 301, 302, 303, 304 (collectively referred to herein as "the leaf routers 301-304") that are interconnected by spines 305, 310, 315. The spine 305 includes the routers 306, 307, the spine 310 includes the routers 311, 312, 313, 314, and the spine 315 includes the routers 316, 317. The leaf routers 301-304 provide connections to one or more servers such as the servers 320, 321, 322 that are connected to the leaf router 301. The routers and spines are assigned corresponding ASN 331-334, 335, 340, 345. The 5 stage Clos network 300 differs from the 5-stage Clos network 200 shown in FIG. 2 because the leaf routers 301-304 not directly connected to the spines 305, 315. Instead, the leaf routers 301, 302 are connected to a multi-access network such as the LAN 340.

Incorporating the LAN 340 avoids linear growth of the number of links required by the spine routers 306, 307 towards the leaf routers 301, 302 as additional leaf routers are connected to the spine 305. For example, if there are 100 leaf routers connected to the spine 305, then each of the spine routers 306, 307 requires at least 100 links for the interconnections with the leaf routers in the absence of the LAN 340. However, if the LAN 340 is incorporated into the 5-stage Clos network 300, each of the leaf routers and the spine routers 306, 307 requires a single link to the LAN 340 or two links to the LAN 340 to provide redundancy.

The LAN 340 also introduces several drawbacks related to forming BGP sessions among the routers. In the illustrated embodiment, the routers 301, 302, 306, 307 multicast a BGP Hello message to the LAN 340 and the multicast BGP Hello messages are received by all the other routers 301, 302, 306, 307 that are connected to the LAN 340. Consequently, a full mesh of external BGP sessions are formed among the routers 301, 302, 306, 307. The fundamentals of a Clos network topology are therefore broken because:
1) an e-BGP session is formed among leaf routers 301, 302. If there are N leaf routers in the LAN 340, then each leaf router will have (N−1) unwanted and unnecessary e-BGP sessions to other leaf routers. The number N could be in the hundreds depending on the deployment scenario.
2) An e-BGP session is formed among routers 306, 307, which are members of the same spine 305.

Irrespective of the LAN 340 being part of the 5-stage Clos network 300, a full mesh of e-BGP sessions is not required. If there are N routers connected in the LAN 340, then each router has (N−1) e-BGP sessions to other routers. The number N could be in hundreds. Instead, as disclosed herein, one of the routers can act as a master that forms an e-BGP session to the other routers connected to the LAN 340. Then only the master router needs (N−1) e-BGP sessions to rest of the routers in the LAN.

Interconnecting the routers 301, 302, 306, 307 via the LAN 340 also increases messaging overhead in the 5-stage Clos network 300. A simple LAN 340 of N routers would need N (N−1)/2 reachability advertisements to represent the links between the routers, even though all routers are mutually adjacent on the LAN 340 and any data packet sent by one router is received by the other routers connected to the LAN 340. For example, the four BGP routers 301, 302, 306, 307 in LAN 340 would need 4*(4−1)/2=6 reachability advertisements to represent the links between the routers 301, 302, 306, 307, even though all four routers 301, 302, 306, 307 are mutually adjacent on the LAN 340 and any data packet sent by one is received by the other four routers 301, 302, 306, 307. Instead, as discussed herein, the entire LAN 340 segment can be represented as a single link, so only one reachability advertisement is needed irrespective of the number of routers in the LAN 340.

The drawbacks associated with the LAN 340 are avoided by selecting one of the routers 301, 302, 306, 307 (or another router connected to the LAN 340) as a designated router (DR). In some embodiments, a first router from the set of routers 301, 302, 306, 307 configures or elects one of the routers from the set as a DR. The first router can be chosen as the DR or another router in the set can be chosen as the DR. In response to the first router being configured or elected as the DR, the first router forms adjacencies with non-DR routers from the set and distributes reachability advertisements from the set of routers to the non-DR routers in the set. In response to another router being chosen as the DR and thus the first router not being the DR, the first router forms an adjacency with the DR. The first router then conveys reachability advertisements to the DR and receives reachability advertisements from the routers in the set via the DR. The router that is selected as the DR represents the set of routers 301, 302, 306, 307 in the LAN 340 as a single virtual router to one or more external networks that are connected to the LAN 340, such as the spine 305. In some cases, a backup DR (BDR) is also selected and performs the functions of the DR in response to the DR failing or otherwise becoming unavailable. The DR and BDR form adjacencies with all the other BGP routers in the LAN 340. The DR and BDR may form an adjacency among them if required by the network. Formation of a new adjacency is followed by establishment of a BGP session with the adjacent neighbor.

The DR and, if present, the BDR are determined using dynamic election or single-sided provisioning. In dynamic election techniques, the BGP routers in a multi-access network (such as the routers 301, 302, 306, 307 in the LAN 340) are assigned priority values. A BGP router includes its priority in the Hello messages that it multicasts towards other routers. The DR and, if present, the BDR are elected based on the following election rules:
1) BGP router with the highest priority is elected DR. By default, all routers have a priority of 1.
2) If there is a tie, a router with the highest BGP identifier is elected as the DR. The router with the second highest priority or BGP identifier is elected as the BDR.

If both the DR and the BDR fail, then the remaining routers re-elect a new DR and BDR among themselves by using the above election rules.

In the illustrated embodiment, one of the spine routers 306, 307 should be elected as a DR or BDR to uphold the interconnection rules of the 5-stage Clos network 300. The leaf routers 301, 302 connected to LAN 340 are therefore assigned priority 1, the router 306 is assigned priority 100 and the router 307 is assigned priority 50. Following the rules 1 and 2, the router 306 is elected the DR and the router 307 is elected the BDR. However, an adjacency between the routers 306, 307 should not be established because they are members of same spine 305. Furthermore, upon failure of both the routers 306, 307, the leaf routers 301, 302 would elect one of them as DR and another as BDR, which should not occur because there should be no adjacency among leaf routers in a Clos network. The election process therefore adds the following secondary election rules:
3) If adjacency between DR and BDR is not desirable, then each router is configured not to form adjacency with counterpart DR/BDR if the router is elected as DR/BDR. At least routers 306, 307 configured in this manner. However, the BDR should continue to monitor the Hellos from DR for liveliness of DR. If Hellos from DR times out, then the BDR takes the requisite actions to take over the role as DR.
4) The router that should not form adjacency among themselves is configured with priority of 0. Priority value 0 is a special priority, which indicates that router configured with this value ignores Hello messages from another router that indicates priority as 0. Leaf routers 301, 302 are configured with priority 0.

There is no dynamic election of DR and BDR in single-sided provisioning. Instead, the roles of DR and BDR are configured explicitly based on the following configuration rules:

1) The BGP router that would play the role of a DR/BDR is only configured to multicast Hello messages, i.e., plays an active role in sending Hellos.
2) A router not configured as DR/BDR does not multicast Hello messages. When a non-DR (or non-BDR) router receives a Hello message from a neighboring DR/BDR then it starts sending "unicast" Hello messages to the neighboring router to form an adjacency. If the Hello adjacency goes down, then the router stops unicasting Hellos. So, the router plays a passive role in sending Hellos.

If both the DR and, if present, the BDR fail, then the remaining routers do not re-elect a new DR and BDR among themselves since all remaining routers play passive roles in forming hello adjacencies.

In the illustrated embodiment, the routers 306, 307 should be configured as the DR and, if present, the BDR to uphold the interconnection rules of a Clos network. The routers 306, 307 are therefore configured to play an active role in the LAN 340 and as a result the routers 306, 307 only multicast Hello messages in LAN 340. The leaf routers 301, 302 are configured for a passive role and wait for Hello messages from the DR and, if present, the BDR. In response to receiving Hello messages from a DR or, if present, a BDR, the routers 301, 302 unicast Hello messages to the DR or, if present, the BDR. As a result, an adjacency is formed from a leaf router 301, 302 to a DR/BDR only. However, in the Clos network, an adjacency between the routers 306, 307 is not desirable as they are members of same spine 305. The following secondary configuration rule is therefore added:

3) If adjacency between DR and BDR is not desirable, then each router is configured not to form adjacency with counterpart DR/BDR if the router itself is configured as DR/BDR. In the illustrated embodiment, the routers 306, 307 are configured as DR and, if present, the BDR. The routers 306, 307 ignore multicast Hellos for forming adjacency and only accept unicast Hellos to consider for adjacency. However, the BDR should continue to monitor the multicast Hellos from DR for liveliness of DR. If Hellos from DR times out, then the BDR take the requisite actions to take over the role as DR.

Figure 4:
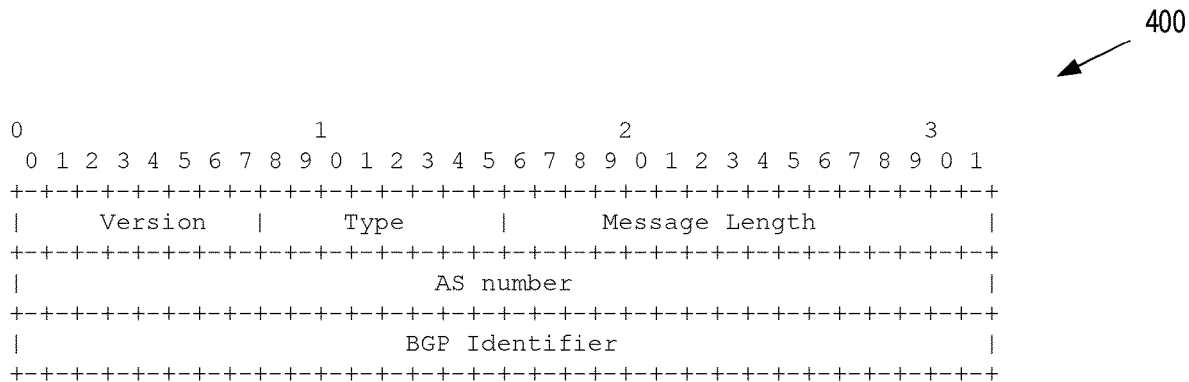
FIG. 4 is a message header for a user datagram protocol (UDP) based BGP message, including a Hello message used to perform link-level BGP neighbor discovery according to some embodiments.

FIG. 4 is a message header 400 that is used in UDP based BGP messages, including the Hello message to perform link-level BGP neighbor discovery according to some embodiments. The message header 400 includes the following fields:

Version: This 1-octet unsigned integer indicates the protocol version number of the message. The current BGP version number is 4.

Type: The type of BGP message. Hello message is assigned type 1.

Message Length: This 2-octet unsigned integer specifies the length in octets of the entire BGP UDP message including the header.

AS number: AS Number of the sender of the UDP message.

BGP Identifier: BGP Identifier of the sender of the UDP message.

Figure 5:
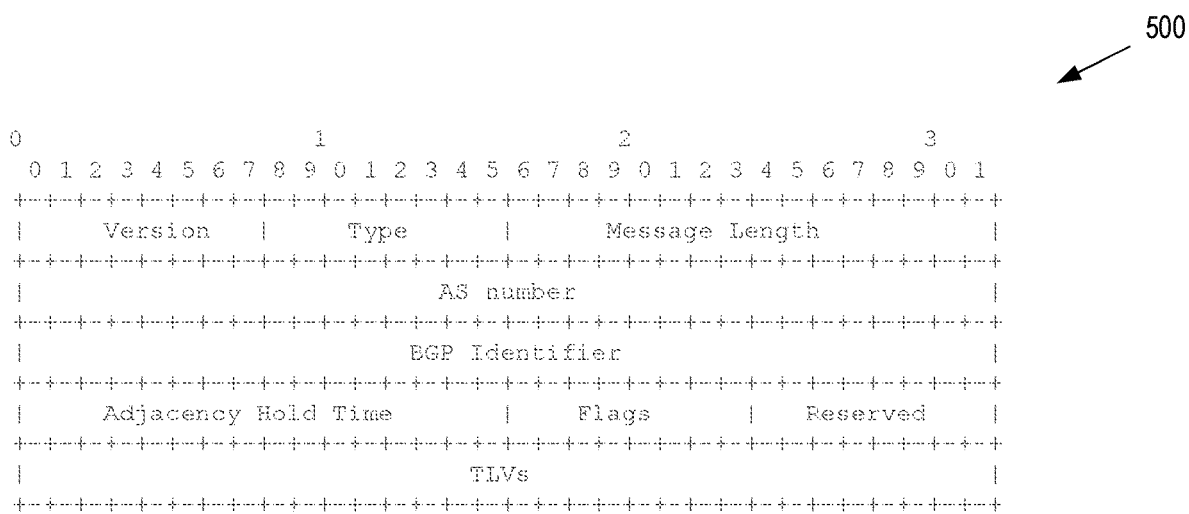
FIG. 5 is a Hello message that is transmitted during unified BGP neighbor discovery according to some embodiments.

FIG. 5 is a Hello message 500 that is transmitted during unified BGP neighbor discovery according to some embodiments. The first 12-octets of the Hello message 500 include some embodiments of the message header 400 shown in FIG. 4. The Hello message 500 also includes the following fields:

Adjacency Hold Time: Hello adjacency hold timer in seconds. Adjacency Hold Time specifies the time, for which the receiving BGP neighbor router SHOULD maintain adjacency state for it, without receipt of another Hello. A value of 0 means that the receiving BGP peer should immediately mark that the adjacency to the sender is going down.

Figure 6:
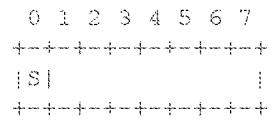
FIG. 6 is a flags field that is included in a Hello message according to some embodiments.

Flags: Currently defined bits are shown in FIG. 6. All other bits should be cleared by sender and are ignored by receiver.

FIG. 6 is a flag field 600 that is included in a Hello message according to some embodiments. The flag field 600 is included in some embodiments of the Hello message 500 shown in FIG. 5. The flag field 600 includes the following bits:

S bit—indicates that this is a State Change Hello message when SET and normal periodic Hello message when CLEAR. Based on the setting of the S flag, there are two variants of the Hello message:

State Change Hello Message: these Hello messages include Type-Length-Values (TLVs) that convey the state and parameters of the local interface and adjacency to other routers on the link. They are generated only when there is a change in state of the adjacency or some parameter at the interface level.

Periodic Hello Message: these are the normal periodic Hello messages which do not include TLVs and are used to maintain the adjacency on the link during steady state conditions.

Reserved: should be set to 0 by sender and is ignored by receiver.

TLVs: This field contains one or more TLVs.

Figure 7:
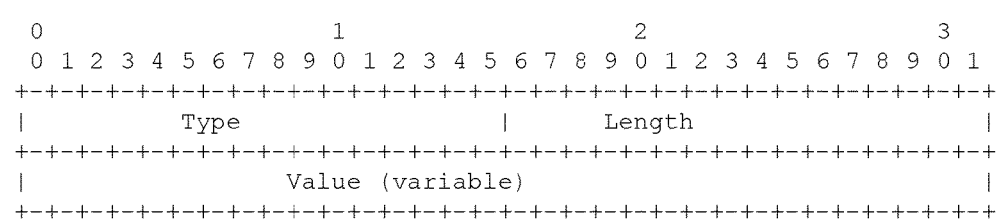
FIG. 7 illustrates a type length value (TLV) format according to some embodiments.

FIG. 7 illustrates a type length value (TLV) format 700 according to some embodiments. The TLV format 700 is used in some embodiments of the Hello message 500 shown in FIG. 5. The definition of the fields in the TLV format 700 are as follows:

Type—16-octet field that indicates the type of TLV.

Length—16-octet field that indicates length of the Value field in units of octets.

Value: The variable sized type dependent value field.

A Hello Message such as the hello message 500 shown in FIG. 5 carries one or more of the following six TLVs:

Accepted ASN List TLV

A TLV that is used to signal an unordered list of AS numbers from which the BGP router would accept BGP sessions. When not signaled, it indicates that the router accepts BGP peering from any ASN from its neighbors. Indicating the list of ASNs helps avoid the neighbor discovery process getting stuck in a 1-way state where one side keeps attempting to setup adjacency while the other does not accept it due to incorrect ASN.

Peering Address TLV

The Peering Address TLV is used to indicate to the neighbor the address to be used for setting up the BGP TCP session. Along with the peering address, the router can specify its supported route types such as Address Family Identifier (AFI) type and Sub-Address Family Identifier (SAFI) type. When the AFI/SAFI values are specified as 0/0, then it indicates that the neighbor can attempt for negotiation of any AFI/SAFIs. Multiple instances of this TLV may be included in the Hello message, one for each peering address (e.g., IPv4 and IPv6 or multiple IPv4 addresses for different AFI/SAFI sessions).

Local Prefix TLV

Some embodiments of the BGP neighbor discovery mechanism require a BGP router to program a route in its local routing table for a prefix belonging to its neighbor router. One such scenario is when the BGP TCP peering is to be setup between the loopback addresses on the neighboring routers. This requires that the routers have reachability to each other's loopback addresses before the TCP session is brought up. The Local Prefix TLV is a TLV that enables a BGP router to explicitly signal its local prefix to its neighbor for setting up of such a local routing entry pointing over the underlying link over which it is being signaled.

Link Attributes TLV

The Link Attributes TLV is a mandatory TLV in a State Change Hello message that signals to the neighbor the link attributes of the interface on the local router. One and only one instance of this TLV is included in the State Change Hello message. A State Change Hello message without this TLV included is discarded and an error logged for the same. This TLV enables a BGP router to learn all its neighbors IP addresses on the specific link as well as its link identifier.

Neighbor TLV

The Neighbor TLV is used by a BGP router to indicate its Hello adjacency state with its neighboring router(s) on the specific link. The neighbor is identified by its AS Number and BGP Identifier. The router includes the Neighbor TLV for each of its discovered neighbors on that link irrespective of its status.

Cryptographic Authentication TLV

The Cryptographic Authentication TLV is a TLV that is used as part of an authentication mechanism for BGP Hello message by securing against spoofing attacks.

Dynamic election of a DR and, if present, a BDR in a multi-access network such as the LAN 340 shown in FIG. 3 is supported using a priority TLV that is used to convey election priorities associated with routers. The priority TLV is incorporated into Hello messages transmitted by the routers.

Figure 8:
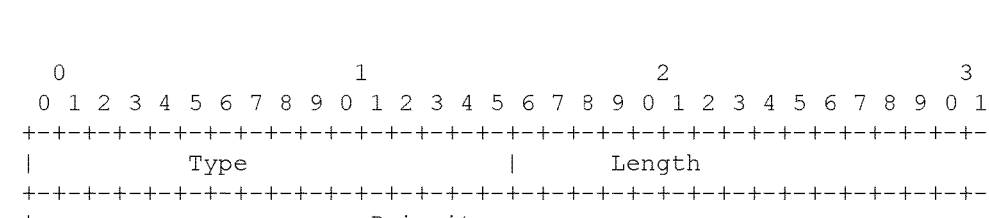
FIG. 8 is a priority TLV format according to some embodiments.

FIG. 8 is a priority TLV format 800 according to some embodiments. The priority TLV format 800 is used to convey priority information in some embodiments of the Hello message 500 shown in FIG. 5. The priority TLV format 800 includes the following fields:
  Type: 7 indicates the TLV as Priority TLV.
  Length: 4, which indicates the length of the Value field is 4 octets.
  Value/Priority: This 4-octet field carries the priority assigned to the BGP router.

Hello messages are multicast on a link with a destination address in the IP header of "all routers on this subnet" group multicast address (e.g., 224.0.0.2 in the IPv4 case and FF02::2 in the IPv6 case). Single-sided provisioning requires that a router playing the passive role (i.e., a non-DR router that is neither configured as DR nor as BDR) should only unicast Hello messages to a DR or BDR after formation of adjacency with the respective DR or BDR. For example, a non-DR router unicasts a Hello message to a DR (or BDR) upon receipt of multicast Hello messages from the DR (or BDR). Some embodiments of BGP routers that play a passive role therefore unicast Hello messages with destination address in IP header as the source address in the IP header of the Hello messages multicast by respective DR or BDR.

Figure 9:
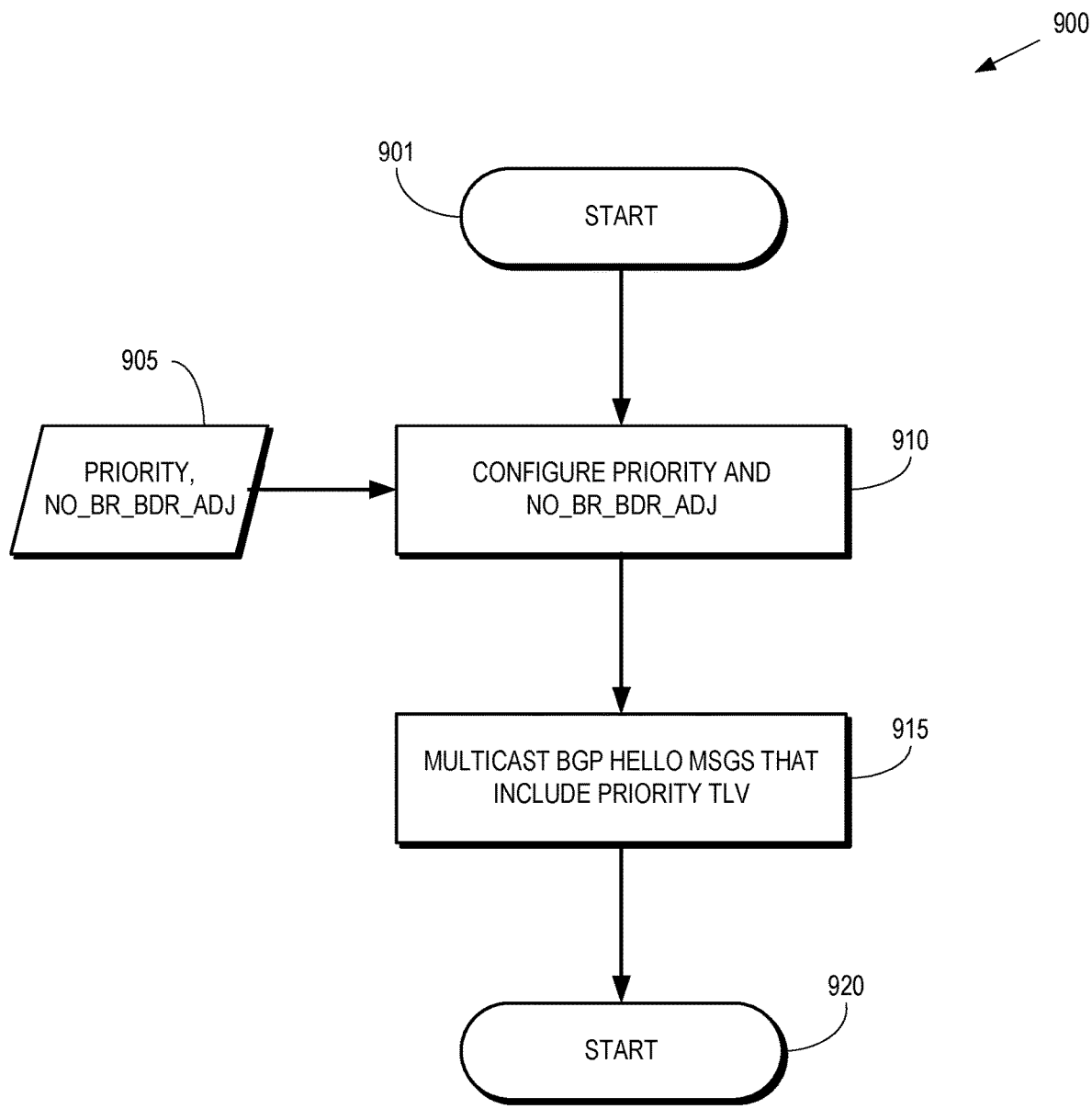
FIG. 9 is a flow diagram of the method of configuring a BGP router for dynamic election of a designated router (DR) according to some embodiments.

FIG. 9 is a flow diagram of the method 900 of configuring a BGP router for dynamic election of a designated router (DR) according to some embodiments. The method 900 is also used to perform dynamic election of a BDR in some embodiments. The method 900 is implemented in some embodiments of the routers 301, 302, 306, 307 that are connected to the multi-access LAN 340 shown in FIG. 3.

The method 900 begins at block 901. The input 905 includes information indicating a priority of the router and the Boolean variable (No_DR_BDR_Adj) that has a value of TRUE to indicate that if the router is elected as a DR (or BDR) then no adjacency is to be formed with a counterpart DR (or BDR).

At block 910, the priority and No_DR_BDR_Adj option are configured in the router. At block 915, the router starts multicasting BGP Hello messages periodically on its link(s) to the multi-access network. The multicast BGP Hello messages include a Priority TLV that encodes the configured priority of the router. The method 900 then flows to the block 920 and the method ends.

A BGP router monitors each Hello message on the multi-access network and uses information in the Hello messages to build a neighbor database. Each time a new neighbor is added to the database, the router executes the DR and BDR election procedure to re-evaluate the DR and BDRs for the network. If after re-evaluation, the DR/BDR changes then the router performs the following actions:
  If this router transitions to DR/BDR role then it forms an adjacency with every neighbor in its database. If it has an adjacency with the counterpart DR/BDR and if it is configured with No_DR_BDR_Adj, then the router tears down the adjacency with the counterpart.
  If this router is neither DR nor BDR then it tears down the hello adjacency with the old DR/BDR and forms a new adjacency with the new DR/BDR.

Figure 10:
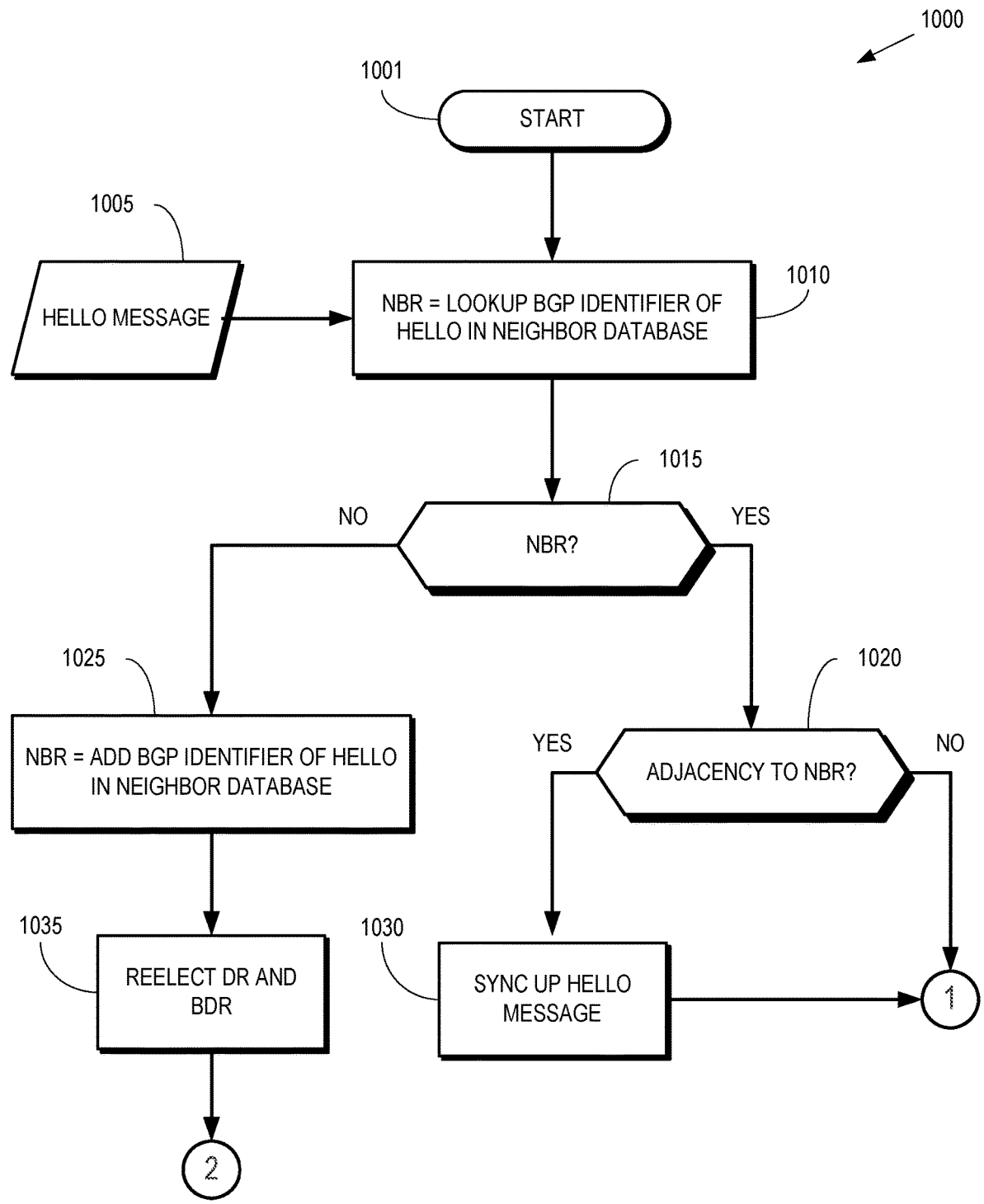
FIG. 10 is a flow diagram of a first portion of a method of processing a Hello message received at a router according to some embodiments.

FIG. 10 is a flow diagram of a first portion 1000 of a method of processing a Hello message received at a router according to some embodiments. The method 1000 is implemented in some embodiments of the routers 301, 302, 306, 307 that are connected to the multi-access LAN 340 shown in FIG. 3.

The method begins at block 1001. The input 1005 includes a Hello message received by the router.

At block 1010, the router looks up the BGP identifier of the sender (which is encoded in the Hello message) in the neighbor database maintained by the router. At decision block 1015, the router determines whether the sender/neighbor is found in the database. If the neighbor is found, the method flows to the decision block 1020. If no neighbor is found, the method flows to the block 1025.

At decision block 1020, the router determines whether there is an existing adjacency with the neighbor. If there is not an existing adjacency, which indicates that the router and the neighbor are non-DR/BDR routers, the method flows to the node 1, which connects to the termination block 1105 shown in FIG. 11. If the router has an existing adjacency, the method flows to the block 1030 and the router synchronizes the Hello message. In some embodiments, synchronizing the Hello message includes one or more of refreshing the adjacency hold timer, synchronizing additional parameters in the Hello message, and the like. The method then flows to the node 1, which connects to the termination block 1105 shown in FIG. 11.

At block 1025, the router adds the new neighbor into the database of discovered neighbors. At block 1035, the router recomputes the DR and BDR in response to discovering the new neighbor. The method then flows to the node 2, which connects to the block 1110 in FIG. 11.

Figure 11:
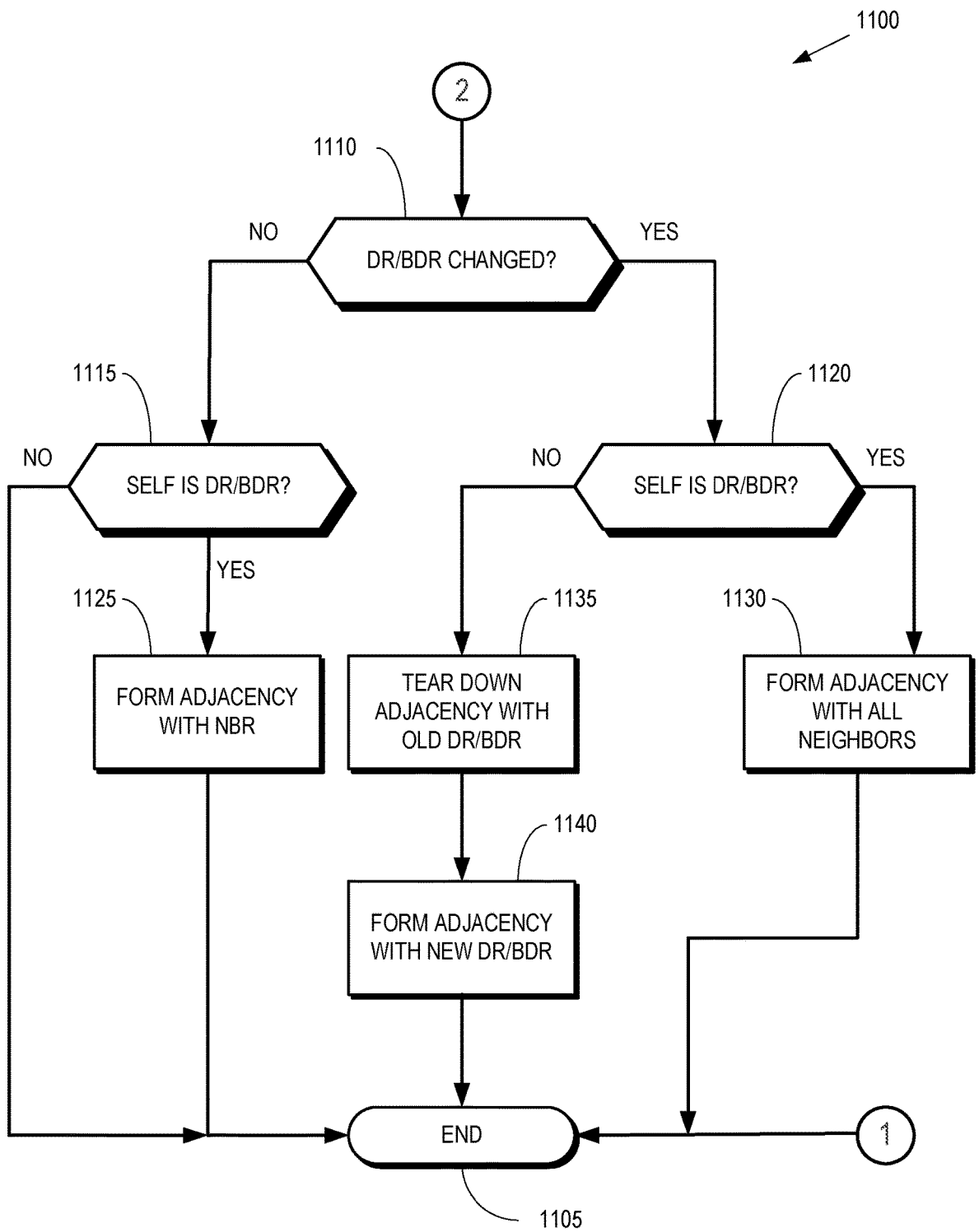
FIG. 11 is a flow diagram of a second portion of the method of processing the Hello message received at the router according to some embodiments.

FIG. 11 is a flow diagram of a second portion 1100 of the method of processing the Hello message received at the router according to some embodiments. Node 1 connects to the decision block 1020 and the block 1030 in FIG. 10. Node 2 connects to the block 1035 in FIG. 10.

At decision block 1110, the router determines whether the DR or BDR status has changed. If not, the method flows to decision block 1115, otherwise the method flows to the decision block 1120.

At decision block 1115, the router determines whether this router is DR or BDR. If this router is not DR or BDR, then no adjacency is to be formed with the new neighbor and no further action needed. The method therefore flows to the termination block 1105 and ends. If the router is DR or BDR, the method flows to the block 1125 and the router forms an adjacency with the new neighbor. The method then flows to the termination block 1105 and the method ends.

At decision block 1120, the router determines whether the elected new DR or BDR is this router. If so, the method flows to the block 1130. If not, the method flows to the block 1135.

At block 1130, the router forms a Hello adjacency with every neighbor in the neighbor database. The method then flows to the termination block 1105 and the method ends.

At block 1135, the router tears down the adjacency with the old DR or BDR since the DR or BDR has changed. At block 1140, the router forms an adjacency with the new DR or BDR. The method then flows to the termination block 1105 and the method ends.

Figure 12:
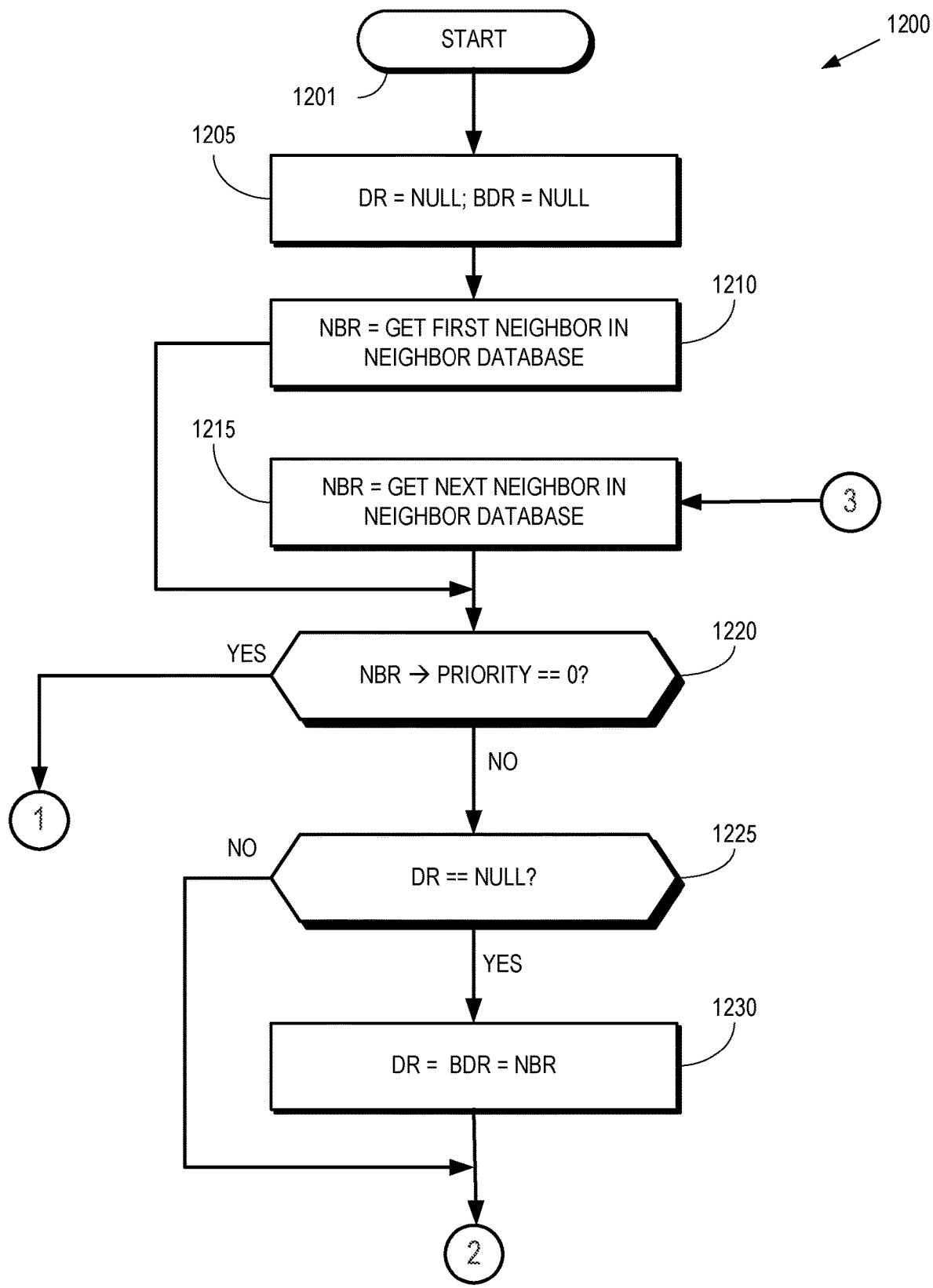
FIG. 12 is a flow diagram of a first portion of a method of computing a DR and, if present, a backup DR (BDR) from a neighbor database according to some embodiments.

FIG. 12 is a flow diagram of a first portion 1200 of a method of computing a DR and, if present, a BDR from a neighbor database according to some embodiments. The method 1200 is implemented in some embodiments of the routers 301, 302, 306, 307 that are connected to the multi-access LAN 340 shown in FIG. 3. The method 1200 is used to implement some embodiments of the block 1035 in FIG. 10.

The method begins at the block 1201. At the block 1205, the router initializes two local variables DR and BDR to NULL. The local variables DR and BDR are used to store the results such as information indicating the computed or elected DR and BDR, respectively.

At block 1210, the router retrieves the first neighbor from the neighbor database. At decision block 1220, the router determines whether the priority of the neighbor is 0. If the priority is 0, then this neighbor cannot be a DR or BDR, so the method flows to the node 1, which connects to the decision block 1325 and FIG. 13. If priority is not 0, the method flows to the decision block 1225 for consideration of this neighbor for either DR or BDR.

At decision block 1225, the router determines whether the value of the variable DR is NULL. A value of NULL indicates that this is the first neighbor evaluated so far with non-zero priority and the method flows to the block 1230 and the router sets the neighbor as both the candidate DR and BDR. If not NULL, the method flows to the node 2, which connects to the decision block 1305 and FIG. 13.

Figure 13:
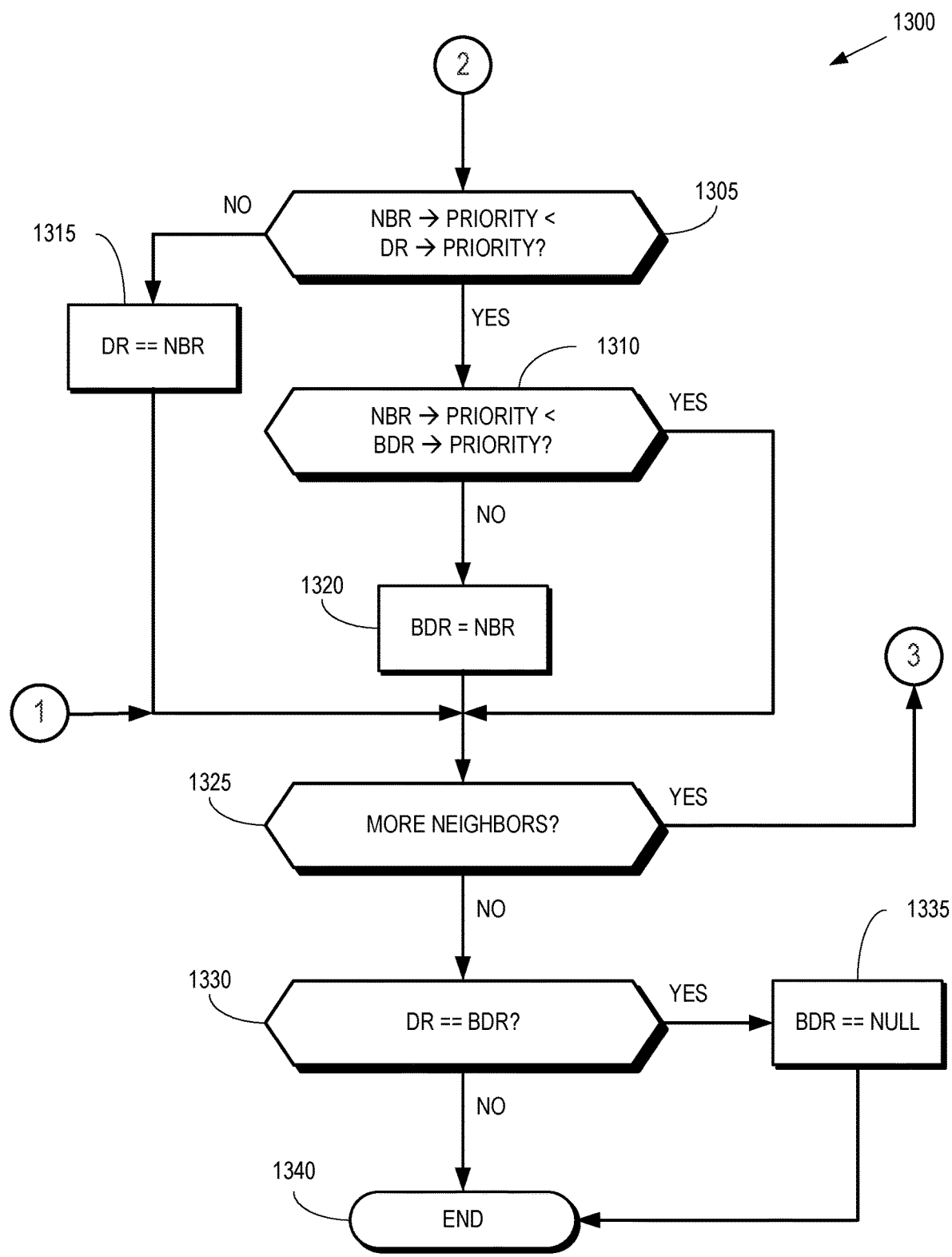
FIG. 13 is a flow diagram of a second portion of the method of computing the DR and, if present, the BDR from the neighbor database according to some embodiments.

FIG. 13 is a flow diagram of a second portion 1300 of the method of computing the DR and, if present, the BDR from the neighbor database according to some embodiments. The node 1 connects to the decision block 1220 in FIG. 12. The node 2 connects to the block 1230 in FIG. 12. The node 3 connects to the block 1215 in FIG. 12.

At decision block 1305, the router determines whether the priority of the neighbor is less than the priority of candidate DR. If not, the method flows to the block 1315 and the router sets the neighbor as the candidate DR because a neighbor with higher priority than priority of candidate DR has been found. If the priority of the neighbor is less than the priority of the candidate DR, the method flows to the decision block 1310.

At decision block 1310, the router determines whether the priority of the neighbor is less than the priority of candidate BDR. If not, the method flows to the block 1320 and the router sets the neighbor as the candidate BDR because a neighbor with higher priority than the priority of the candidate BDR has been found. If the priority of the neighbor is less than the priority of the candidate BDR, the method flows to the decision block 1325.

At decision block 1325, the router determines whether there are more neighbors in the database. If none, the method flows to the decision block 1330. If at least one more neighbor is found in the database, the method flows to node 3, which connects to the block 1215 in FIG. 12 and the router gets the next neighbor from the database.

At decision block 1330, the router determines whether the DR and BDR are same. If they are the same, the method proceeds to the block 1335 and the router sets the BDR to NULL, which means no BDR found. The method then flows to the termination block 1340 and the method ends. If they are not the same, the method flows to the termination block 1340 and the method ends.

Figure 14:
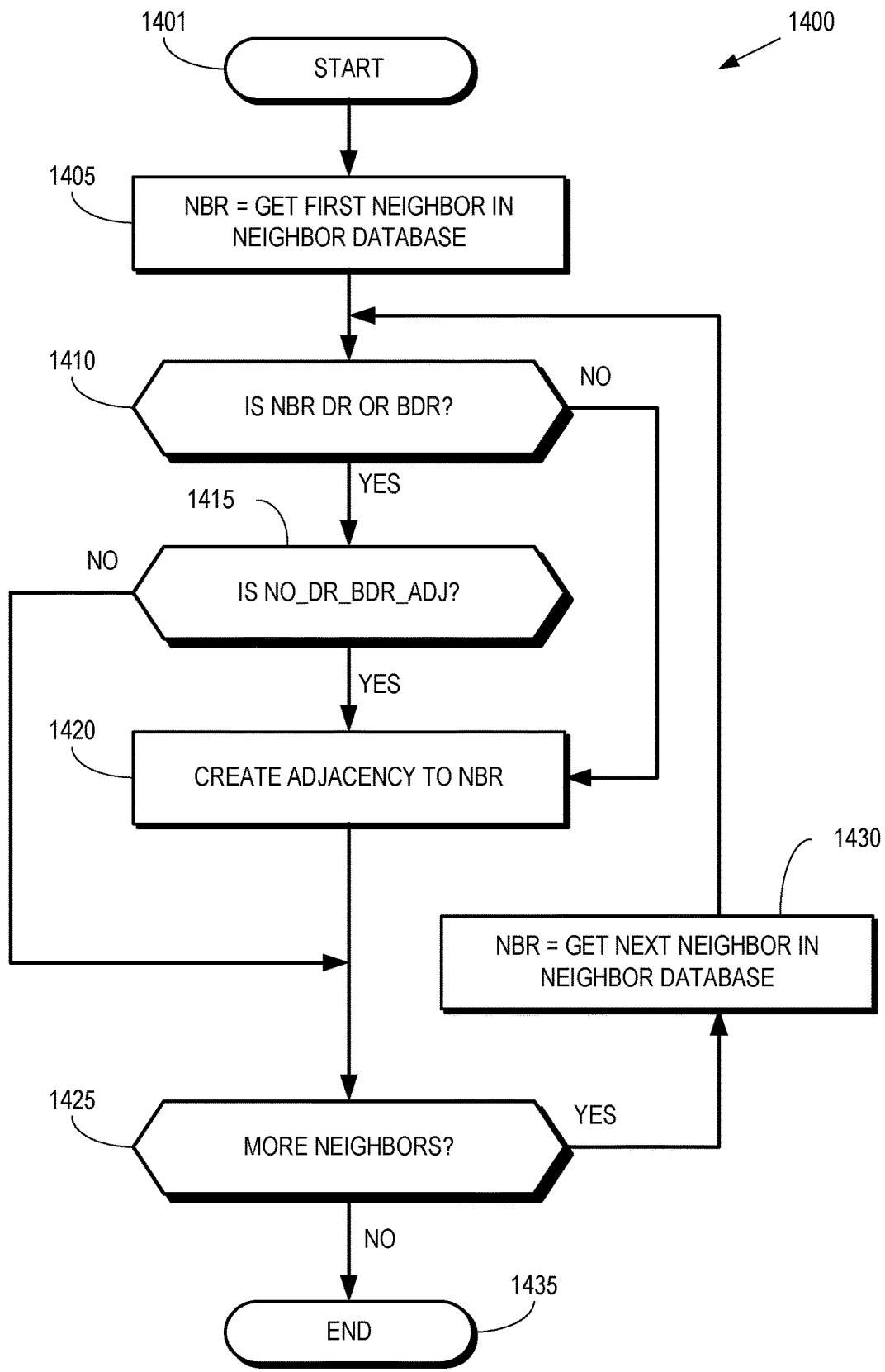
FIG. 14 is a flow diagram of a method of forming adjacency from a DR/BDR to neighbors according to some embodiments.

FIG. 14 is a flow diagram of a method 1400 of forming adjacency from a DR/BDR to neighbors according to some embodiments. The method 1400 is implemented in some embodiments of the routers 301, 302, 306, 307 that are connected to the multi-access LAN 340 shown in FIG. 3. The method 1400 is used to implement some embodiments of the block 1130 in FIG. 11. In the following discussion, the term "router" refers to the DR or BDR that implements the method 1400.

The method 1400 begins at the block 1401. At block 1405, the router retrieves the first neighbour from the neighbour database. At decision block 1410, the router determines whether the neighbour has been elected as DR ort BDR. If so, the method 1400 flows to the decision block 1415, otherwise, the method 1400 flows to the block 1420.

At decision block 1415, the router determines whether this router is configured not to establish any adjacency to a DR or BDR, e.g., based on the variable NO_DR_BDR_ADJ that is set if the router is configured not to establish any adjacency to a DR or BDR. If yes, the method 1400 flows to the block 1420, otherwise, the method 1400 flows to the decision block 1425.

At block 1420, the router creates an adjacency with the neighbour.

At decision block 1425, the router determines whether there are more neighbours in the database. If there are more neighbors in the database, the method 1400 flows to the block 1430 and the router retrieves the next neighbor from the neighbor database. The method 1400 then flows to decision block 1410 to repeat the subsequent steps for the next neighbour. If there are no more neighbors in the database, the method 1400 flows to the termination block 1435 and the method 1400 ends.

Figure 15:
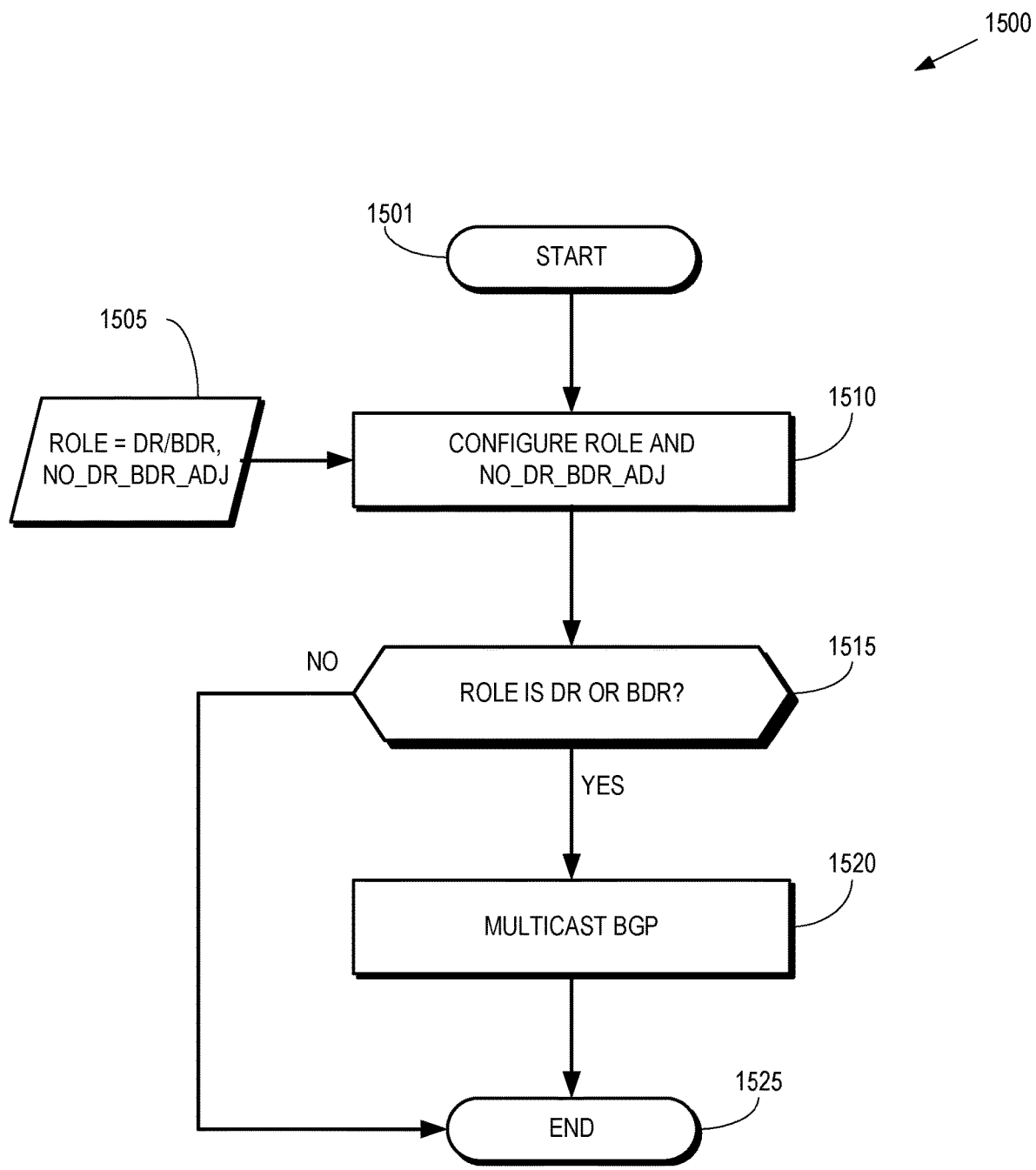
FIG. 15 is a flow diagram of the method of configuring a router as a DR using single-sided provisioning according to some embodiments.

FIG. 15 is a flow diagram of the method 1500 of configuring a router as a designated router (DR) using single-sided provisioning according to some embodiments. The method 1500 is also used to configure a BDR in some embodiments. The method 1500 is implemented in some embodiments of the routers 301, 302, 306, 307 that are connected to the multi-access LAN 340 shown in FIG. 3.

The method 1500 begins at block 1501. The input 1505 includes information indicating a role for the router. The role can be DR, BDR, or neither DR nor BDR. The input 1505 also includes the Boolean variable (No_DR_BDR_Adj), which is valid only if the role of the router is either a DR or a BDR. The variable No_DR_BDR_Adj has a value of TRUE to indicate that the router is configured as a DR (or BDR) and no adjacency is to be formed with a counterpart DR (or BDR).

At block 1510, the role and No_DR_BDR_Adj option are configured in the router. At decision block 1515, the router determines whether its role is DR or BDR. If the router is assigned neither role, the method 1500 flows to the termination block 1525 and the method 1500 ends. If the router is assigned the role of DR or BDR, the method 1500 flows to the block 1520.

At block 1520, the router starts multicasting BGP Hello messages periodically on its link(s) to the multi-access network. The method 1500 then flows to the block 1525 and the method 1500 ends.

Figure 16:
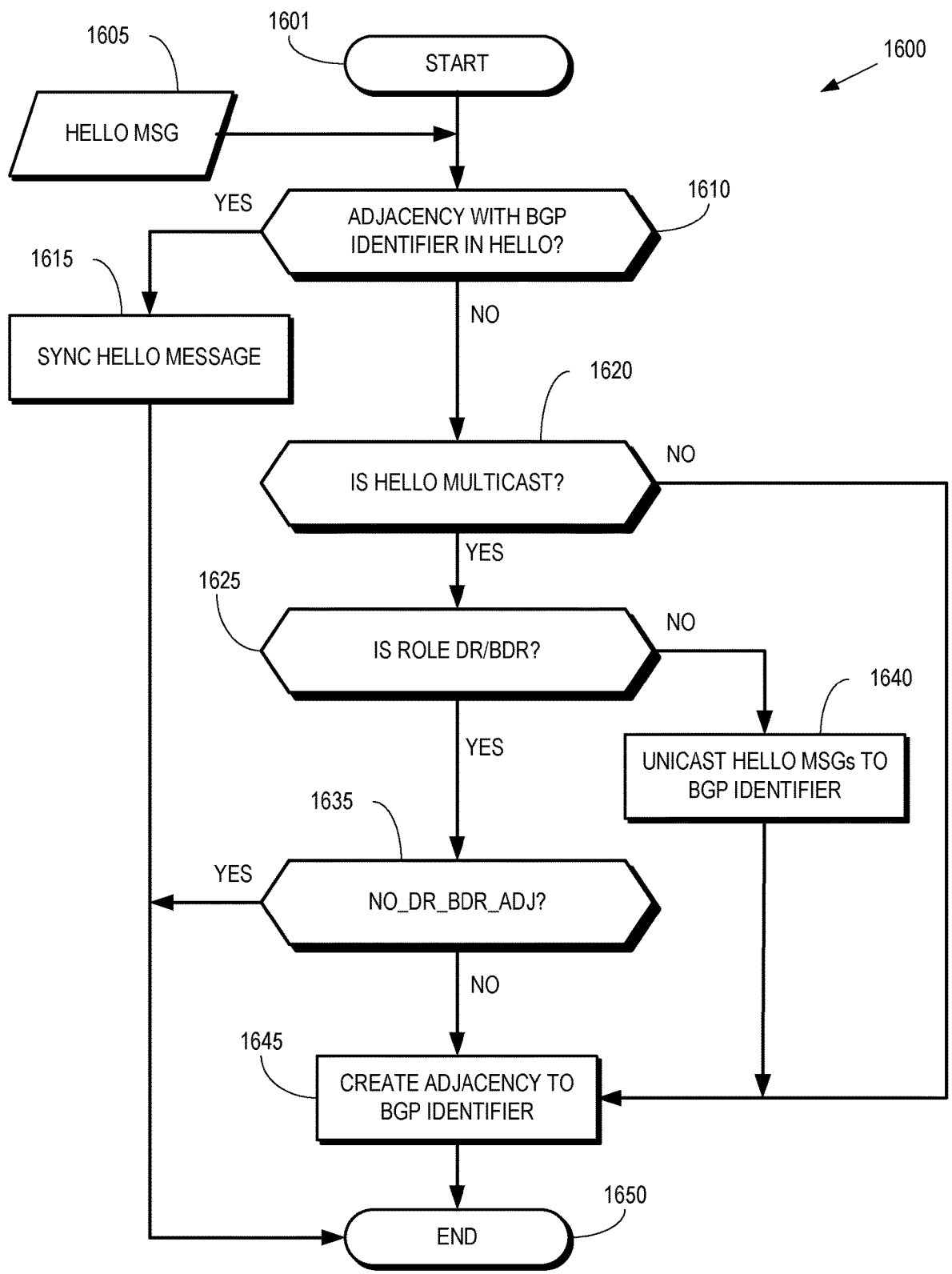
FIG. 16 is a flow diagram of the method of processing a received Hello message in a router configured using single-sided provisioning according to some embodiments.

FIG. 16 is a flow diagram of the method 1600 of processing a received Hello message in a router configured using single-cited provisioning according to some embodiments. The method 1600 is implemented in some embodiments of the routers 301, 302, 306, 307 that are connected to the multi-access LAN 340 shown in FIG. 3.

The method 1600 begins at block 1601. The input 1605 includes a Hello message received by the router on a link.

At decision block 1610, the router determines whether the router has an adjacency with the router that sent the Hello message. The neighbor is identified by the BGP identifier encoded in the Hello message. If the router has an adjacency, the method 1600 flows to the block 1615. Otherwise, the method 1600 flows to the decision block 1620.

At block 1615, the router synchronizes the Hello message. In some embodiments, synchronizing includes refreshing the adjacency hold timer, synchronizing additional parameters in the Hello message, and the like to the adjacency. The method 1600 then flows to the termination block 1650 and the method 1600 ends.

At decision block 1620, the router determines whether the Hello message was multicast by a neighbor, which indicates whether the neighbor is playing the role of DR/BDR. If the Hello message was not multicast, the method 1600 flows to block 1645. Otherwise, the method 1600 flows to the decision block 1625.

At decision block 1625, the router determines whether this router is playing the role of DR/BDR. If the router is playing the role of DR/BDR, the method 1600 flows to the decision block 1635. Otherwise, the method flows to the block 1640.

At decision block 1635, the router determines whether this router is configured with No_BR_BDR_Adj as TRUE. If yes, then no adjacency is to be formed with DR/BDR neighbor. The method 1600 therefore flows to the termination block 1650 and the method 1600 ends. If no, the method flows to the block 1645.

At block 1640, the router starts unicasting periodic Hello messages to the neighbor because the router is playing the passive role in the adjacency with then DR/BDR neighbor. The destination IP address of the periodic unicast Hello messages is the source IP address of the received Hello message. The method 1600 then flows to the block 1645.

Figure 17:
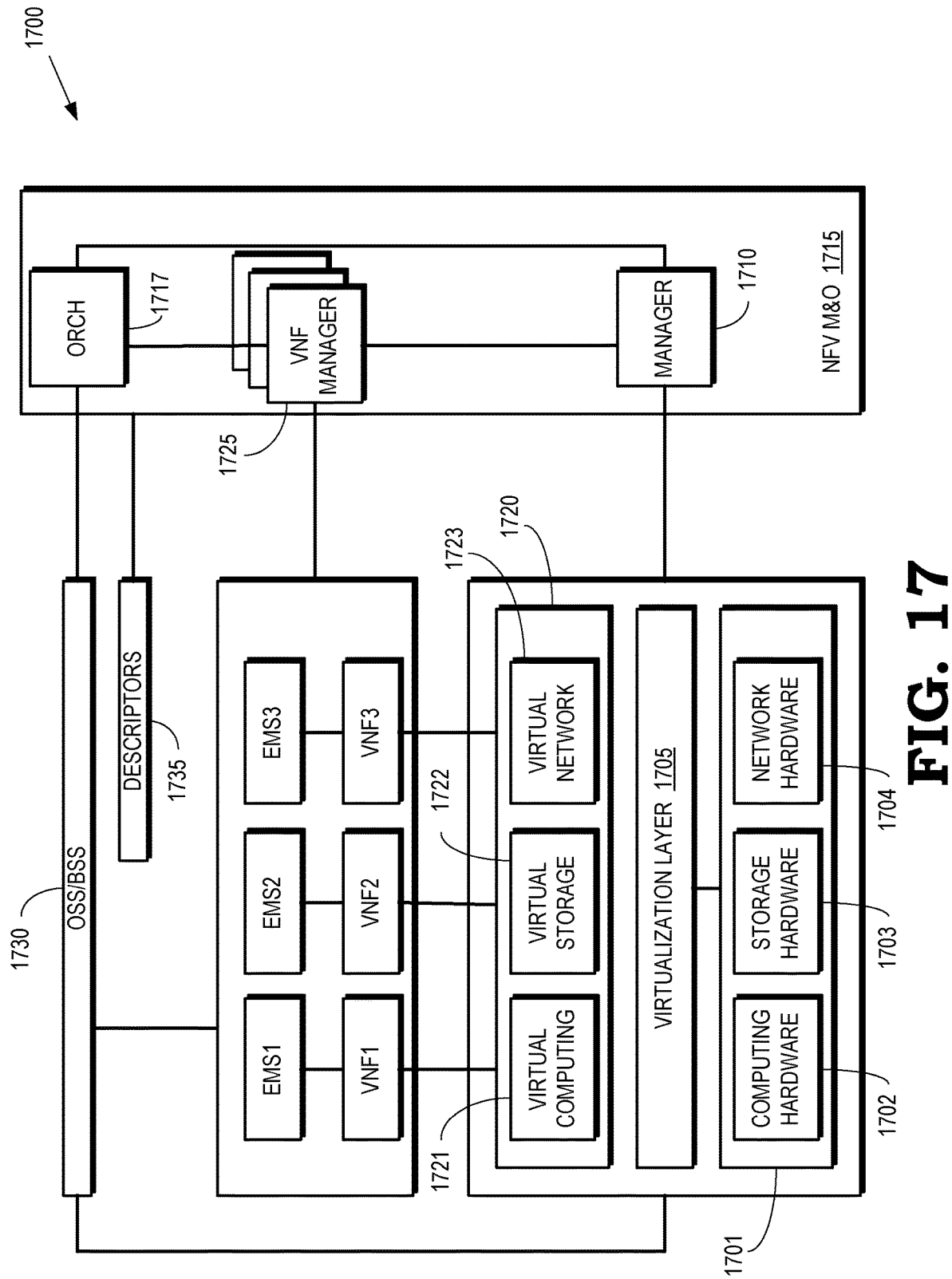
FIG. 17 is a block diagram of a network function virtualization (NFV) architecture according to some embodiments.

At block 1645, the router creates a hello adjacency with the neighbor. The method 1600 then flows to the termination block 1650 and the method 1600 ends FIG. 17 is a block diagram of an NFV architecture 1700 according to some embodiments. The NFV architecture 1700 is used to implement some embodiments of the 5-stage Clos network 300 shown in FIG. 3. The NFV architecture 1700 includes hardware resources 1701 including computing hardware 1702, storage hardware 1703, and network hardware 1704. The computing hardware 1702 is implemented using one or more processors, the storage hardware 1703 is implemented using one or more memories, and the network hardware 1704 is implemented using one or more transceivers, transmitters, receivers, interfaces, and the like.

A virtualization layer 1705 provides an abstract representation of the hardware resources 1701. The abstract representation supported by the virtualization layer 1705 can be managed using a virtualized infrastructure manager 1710, which is part of the NFV management and orchestration (M&O) module 1715. Some embodiments of the manager 1710 are configured to collect and forward performance measurements and events that may occur in the NFV architecture 1700. For example, performance measurements may be forwarded to an orchestrator (ORCH) 1717 implemented in the NFV M&O 1715. The hardware resources 1701 and the virtualization layer 1705 may be used to implement virtual resources 1720 including virtual computing resources 1721, virtual storage resources 1722, and virtual networking resources 1723.

Virtual networking functions (VNF1, VNF2, VNF3) run over the NFV infrastructure (e.g., the hardware resources 1701) and utilize the virtual resources 1720. For example, the virtual networking functions (VNF1, VNF2, VNF3) may be implemented using virtual machines supported by the virtual computing resources 1721, virtual memory supported by the virtual storage resources 1722, or virtual networks supported by the virtual network resources 1723. Element management systems (EMS1, EMS2, EMS3) are responsible for managing the virtual networking functions (VNF1, VNF2, VNF3). For example, the element management systems (EMS1, EMS2, EMS3) may be responsible for fault and performance management. In some embodiments, each of the virtual networking functions (VNF1, VNF2, VNF3) is controlled by a corresponding VNF manager 1725 that exchanges information and coordinates actions with the manager 1710 or the orchestrator 1717.

The NFV architecture 1700 may include an operation support system (OSS)/business support system (BSS) 1730. The OSS/BSS 1730 deals with network management including fault management using the OSS functionality. The OSS/BSS 1730 also deals with customer and product management using the BSS functionality. Some embodiments of the NFV architecture 1700 use a set of descriptors 1735 for storing descriptions of services, virtual network functions, or infrastructure supported by the NFV architecture 1700. Information in the descriptors 1735 may be updated or modified by the NFV M&O 1715.

The NFV architecture 1700 implements network slices that provide control plane functions or user plane functions. A network slice is a complete logical network that provides communication services and network capabilities, which can vary from slice to slice. User equipment can concurrently access multiple slices that support multiple service flows between a core network and the user equipment. Some embodiments of user equipment provide Network Slice Selection Assistance Information (NSSAI) parameters to the network to assist in selection of a slice instance for the user equipment. A single NSSAI may lead to the selection of several slices. The NFV architecture 1700 can also use device capabilities, subscription information and local operator policies to do the selection. An NSSAI is a collection of smaller components, Single-NSSAIs (S-NSSAI), which each include a Slice Service Type (SST) and possibly a Slice Differentiator (SD). Slice service type refers to an expected network behavior in terms of features and services (e.g., specialized for broadband or massive IoT), while the slice differentiator can help selecting among several network slice instances of the same type, e.g. to isolate traffic related to different services into different slices.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

As used herein, the term "circuitry" may refer to one or more or all the following:
a) hardware-only circuit implementations (such as implementations and only analog and/or digital circuitry) and
b) combinations of hardware circuits and software, such as (as applicable):
i. a combination of analog and/or digital hardware circuit(s) with software/firmware and
ii. any portions of a hardware processor(s) with software (including digital signal processor(s), software, and memory(ies) that work together to cause an apparatus, such as a mobile phone or server, to perform various functions) and
c) hardware circuit(s) and/or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in a server, a cellular network device, or other computing or network device.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
   determining, at a first router, a designated router (DR) from a set of routers that are interconnected by a network based on a border gateway protocol (BGP), wherein the set comprises the first router; and
   in response to the first router being the DR, forming adjacencies with non-DR routers from the set and distributing reachability advertisements from the set of routers to the non-DR routers in the set.

2. The method of claim 1, further comprising:
   in response to the first router not being the DR, forming an adjacency with the DR, conveying reachability advertisements to the DR, and receiving reachability advertisements from the routers in the set via the DR.

3. The method of claim 1, wherein determining the DR for the set of routers comprises receiving information at the first router indicating an identity of the DR.

4. The method of claim 1, wherein determining the DR for the set of routers comprises electing a DR based on priority values assigned to the routers in the set and advertised in messages transmitted by the routers in the set.

5. The method of claim 1, further comprising:
   in response to the first router being the DR, multicasting a first message to the non-DR routers identifying the first router as the DR.

6. The method of claim 5, further comprising:
in response to receiving the first message from the DR, unicasting at least one second message from at least one of the non-DR routers to the DR.

7. The method of claim 6, further comprising:
forming the adjacencies with the non-DR routers based on second messages that are unicast from the non-DR routers to the DR.

8. The method of claim 7, further comprising:
establishing transport layer protocol connections between the DR and the non-DR routers; and
establishing an underlay BGP over the transport layer protocol connections between the DR and the non-DR routers.

9. The method of claim 7, wherein the first message comprises at least one of an autonomous system number (ASN) associated with the first router, a border gateway control protocol (BGP) identifier of the first router, a hold time for the first message, and a Type-Length-Value (TLV) field.

10. The method of claim 1, further comprising:
in response to the first router being the DR, representing the set of routers in the network as a single virtual router to at least one external network that is connected to the network.

11. The method of claim 10, wherein the at least one external network comprises a spine or a spine router in a Clos topology.

12. The method of claim 1, further comprising:
determining, at the first router, a backup DR (BDR) from the set of routers that are interconnected by the network.

13. The method of claim 12, further comprising:
in response to detecting failure or unavailability of the DR, forming adjacencies between the BDR and the non-DR routers from the set and distributing, from the BDR, reachability advertisements from the set of routers to the non-DR routers in the set.

14. An apparatus, comprising:
at least one processor; and
at least one memory storing instructions that, when executed by the at least one processor, cause the apparatus to at least:
determine, at a first router, a designated router (DR) from a set of routers that are interconnected by a network based on a border gateway protocol (BGP), wherein the set comprises the first router; and
in response to the first router being the DR, form adjacencies with non-DR routers from the set and distribute reachability advertisements from the set of routers to the non-DR routers in the set.

15. The apparatus of claim 14, wherein the instructions, when executed by the at least one processor, cause the apparatus to:
in response to the first router not being the DR, form an adjacency with the DR and convey reachability advertisements to the DR and receive reachability advertisements from the routers in the set via the DR.

16. The apparatus of claim 14, wherein the instructions, when executed by the at least one processor, cause the apparatus to:
receive information indicating an identity of the DR, and determine the identity of the DR based on the information.

17. The apparatus of claim 14, wherein the instructions, when executed by the at least one processor, cause the apparatus to:
elect a DR based on priority values assigned to the routers in the set and advertised in messages transmitted by the routers.

18. The apparatus of claim 14, wherein the instructions, when executed by the at least one processor, cause the apparatus to:
in response to the first router being the DR, multicast a first message to the non-DR routers identifying the first router as the DR;
receive second messages that are unicast from the non-DR routers to the DR; and
form the adjacencies with the non-DR routers based on the second messages.

19. The apparatus of claim 18, wherein the instructions, when executed by the at least one processor, cause the apparatus to:
establish transport layer protocol connections between the DR and the non-DR routers; and
establish underlay routing protocols over the transport layer protocol connections between the DR and the non-DR routers.

20. The apparatus of claim 18, wherein the first message comprises at least one of an autonomous system number (ASN) associated with the first router, a border gateway control protocol (BGP) identifier of the first router, a hold time for the first message, and a Type-Length-Value (TLV) field.

21. The apparatus of claim 14, wherein the instructions, when executed by the at least one processor, cause the apparatus to:
in response to the first router being the DR, represent the set of routers in the network as a single virtual router to at least one external network that is connected to the network.

22. The apparatus of claim 21, wherein the at least one external network comprises a spine or a spine router in a Clos topology.

23. The apparatus of claim 14, wherein the instructions, when executed by the at least one processor, cause the apparatus to:
determine a backup DR (BDR) from the set of routers that are interconnected by the network.

24. The apparatus of claim 23, wherein the instructions, when executed by the at least one processor, cause the apparatus to:
in response to detecting failure or unavailability of the DR, form adjacencies between the BDR and the non-DR routers from the set and the BDR is configured to distribute reachability advertisements from the set of routers to the non-DR routers in the set.

25. A first router, comprising:
at least one processor; and
at least one memory storing instructions that, when executed by the at least one processor, cause the first router at least to perform:
determining, at the first router, a designated router (DR) from a set of routers that are interconnected by a network, wherein the set comprises the first router; and
in response to the first router being the DR, forming adjacencies with non-DR routers from the set and distributing reachability advertisements from the set of routers to the non-DR routers in the set.

26. The first router of claim 25, wherein the instructions, when executed by the at least one processor, cause the first router at least to perform:

in response to the first router not being the DR, forming an adjacency with the DR, conveying reachability advertisements to the DR, and receiving reachability advertisements from the routers in the set via the DR.

\* \* \* \* \*